(12) United States Patent
Ogata et al.

(10) Patent No.: US 9,756,600 B2
(45) Date of Patent: Sep. 5, 2017

(54) INFORMATION PROCESSING APPARATUS, INFORMATION PROCESS METHOD AND PROGRAM

(71) Applicant: Sony Corporation, Tokyo (JP)

(72) Inventors: Takashi Ogata, Tokyo (JP); Masanori Katsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/648,972

(22) PCT Filed: Nov. 13, 2013

(86) PCT No.: PCT/JP2013/080713
§ 371 (c)(1),
(2) Date: Jun. 2, 2015

(87) PCT Pub. No.: WO2014/125689
PCT Pub. Date: Aug. 21, 2014

(65) Prior Publication Data
US 2015/0312878 A1     Oct. 29, 2015

(30) Foreign Application Priority Data
Feb. 12, 2013 (JP) .................. 2013-024192

(51) Int. Cl.
| H04W 24/00 | (2009.01) |
| H04W 64/00 | (2009.01) |
| H04W 24/08 | (2009.01) |
| H04M 3/42 | (2006.01) |
| H04W 88/02 | (2009.01) |

(52) U.S. Cl.
CPC ......... *H04W 64/003* (2013.01); *H04W 24/08* (2013.01); *H04W 64/00* (2013.01);
(Continued)

(58) Field of Classification Search
CPC .......... G01S 5/00; G06F 13/00; H04M 11/00; H04M 2242/28; H04M 2242/30;
(Continued)

(56) References Cited

U.S. PATENT DOCUMENTS

| 2008/0242278 A1* | 10/2008 | Rekimoto | ........... H04L 63/0407 455/414.2 |
| 2009/0322517 A1* | 12/2009 | Kalasapur | .............. G06Q 10/00 340/539.13 |

(Continued)

FOREIGN PATENT DOCUMENTS

| JP | 2010-213300 A | 9/2010 |
| JP | 2011-81431 A | 4/2011 |

(Continued)

OTHER PUBLICATIONS

International Search Report issued Feb. 10, 2014 in PCT/JP2013/080713 (with English language translation).

*Primary Examiner* — Nathan Taylor
(74) *Attorney, Agent, or Firm* — Oblon, McClelland, Maier & Neustadt, L.L.P.

(57) ABSTRACT

Provided is an information processing apparatus including: a wireless station information acquisition unit which acquires information showing wireless stations with which a terminal apparatus is capable of communicating; a clustering unit which generates a wireless station cluster by clustering the wireless stations based on a time at which the wireless stations are capable of communicating with the terminal apparatus; and a stay detection unit which detects a state in which the terminal apparatus is capable of communicating with wireless stations included in the wireless station cluster as a state in which the terminal apparatus is staying at a location corresponding to the wireless station cluster.

19 Claims, 18 Drawing Sheets

(52) U.S. Cl.
CPC .... *H04M 3/42365* (2013.01); *H04M 2242/28* (2013.01); *H04M 2242/30* (2013.01); *H04W 64/006* (2013.01); *H04W 88/02* (2013.01)

(58) Field of Classification Search
CPC ... H04M 3/42; H04M 3/42365; H04W 24/08; H04W 64/00; H04W 64/003; H04W 64/006; H04W 88/02
USPC ...................................................... 455/456.6
See application file for complete search history.

(56) References Cited

U.S. PATENT DOCUMENTS

| | | | |
|---|---|---|---|
| 2012/0040688 A1* | 2/2012 | Kobayashi | G06F 17/30241 455/456.1 |
| 2012/0088525 A1* | 4/2012 | Kurokawa | H04W 4/028 455/456.5 |
| 2012/0136865 A1* | 5/2012 | Blom | G06F 17/30141 707/739 |
| 2013/0337830 A1* | 12/2013 | Haro | H04W 4/02 455/456.1 |
| 2014/0188993 A1* | 7/2014 | Klein | G06Q 10/063 709/204 |

FOREIGN PATENT DOCUMENTS

| | | |
|---|---|---|
| JP | 2012-42993 A | 3/2012 |
| JP | 2012-85095 A | 4/2012 |

\* cited by examiner

INFORMATION PROCESSING APPARATUS, INFORMATION PROCESS METHOD AND PROGRAM

TECHNICAL FIELD

The present disclosure relates to an information processing apparatus, an information processing method, and a program.

BACKGROUND ART

In recent years, a large number of technologies have been developed which acquire position information of a user and provide information to the user based on this, for example, such as the action recognition technology disclosed in Patent Literature 1. Position information of a user is generally expressed as latitude and longitude information. Measurements using a Global Positioning System (GPS) receiver mounted on a terminal apparatus, measurements using the signal strength between fixed base stations in wireless communication, such as a Wi-Fi standard, or the like are used as methods which acquire latitude and longitude information.

CITATION LIST

Patent Literature

Patent Literature 1: JP 2011-81431A

SUMMARY OF INVENTION

Technical Problem

However, it will be difficult to continuously acquire latitude and longitude information of a high accuracy by measurements using GPS, Wi-Fi communication or the like. While GPS provides latitude and longitude information of a high accuracy, the receiver continuously consuming power will accelerate the consumption of the batteries of the terminal apparatus. Further, measurements by GPS will be difficult at locations where radio waves are not received from a satellite, such as within a building. While it is possible for measurements using Wi-Fi communication to be used within a building if a base station is installed, the accuracy of latitude and longitude information will be low compared to that of GPS.

On the other hand, position information of a user himself or herself may often not be necessary at the side which uses the position information of the user, such as in action recognition technology. For example, such as in the technology disclosed in Patent Literature 1, information of location attributes such as whether a user is at home or is at the office, or information such as whether the user is simply staying at some location or is moving, may be necessary, and position information of the user himself or herself may often not be necessary.

Accordingly, the present disclosure proposes a new and improved information processing apparatus, information processing method and program capable of detecting a stay of a user without depending on position information.

Solution to Problem

According to the present disclosure, there is provided an information processing apparatus including: a wireless station information acquisition unit which acquires information showing wireless stations with which a terminal apparatus is capable of communicating; a clustering unit which generates a wireless station cluster by clustering the wireless stations based on a time at which the wireless stations are capable of communicating with the terminal apparatus; and a stay detection unit which detects a state in which the terminal apparatus is capable of communicating with wireless stations included in the wireless station cluster as a state in which the terminal apparatus is staying at a location corresponding to the wireless station cluster.

According to the present disclosure, there is provided an information processing method including: acquiring information showing wireless stations with which a terminal apparatus is capable of communicating; generating a wireless station cluster by clustering the wireless stations based on a time at which the wireless stations are capable of communicating with the terminal apparatus; and detecting a state in which the terminal apparatus is capable of communicating with wireless stations included in the wireless station cluster as a state in which the terminal apparatus is staying at a location corresponding to the wireless station cluster.

According to the present disclosure, there is provided a program which causes a computer to implement: a function of acquiring information showing wireless stations with which a terminal apparatus is capable of communicating; a function of generating a wireless station cluster by clustering the wireless stations based on a time at which the wireless stations are capable of communicating with the terminal apparatus; and a function of detecting a state in which the terminal apparatus is capable of communicating with wireless stations included in the wireless station cluster as a state in which the terminal apparatus is staying at a location corresponding to the wireless station cluster.

A stay of a user can be detected, without specifying position information of the user, by detecting a stay location of the user based on a result of clustering wireless stations with which a terminal apparatus carried by the user is capable of communicating, and detecting a continuation of a state capable of communicating with these wireless stations as a stay of the user.

Advantageous Effects of Invention

According to an embodiment of the present disclosure such as described above, a stay of a user can be detected without depending on position information.

DESCRIPTION OF EMBODIMENTS

A preferred embodiment of the present disclosure will be described in detail below with reference to the appended drawings. Note that in this specification and the drawings, the same reference signs are attached to elements having substantially the same function and configuration, thereby omitting duplicate descriptions.

Note that, the description will be given in the following order.

1. First embodiment
1-1. System configuration
1-2. Functional configuration of the information processing apparatus
1-3. Example of AP information
1-4. Example of the clustering process
1-5. Example of the cluster combination process
1-6. Example of stay state detection
2. Second embodiment
3. Third embodiment
4. Hardware configuration
5. Supplemental Remarks

1. First Embodiment (1-1. System Configuration)

Figure 1:
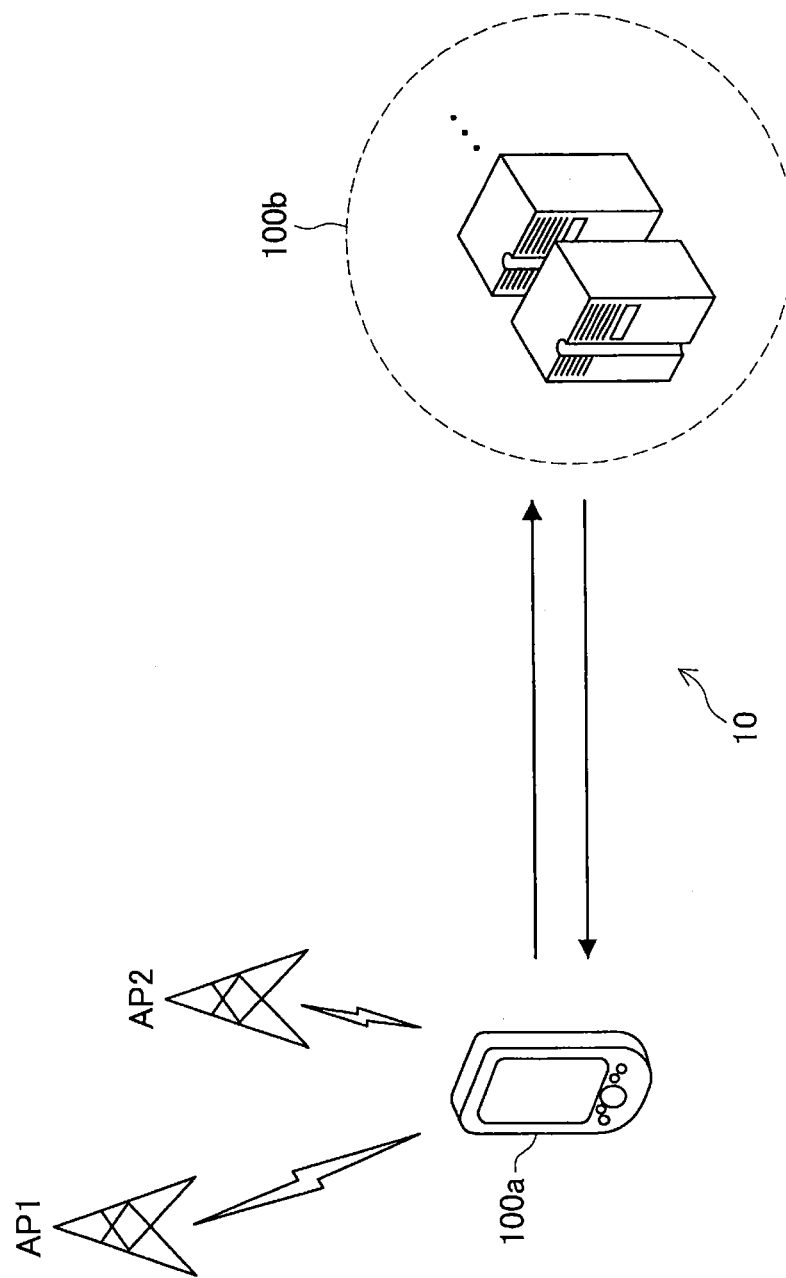
FIG. 1 is a figure which schematically shows a system configuration of a first embodiment of the present disclosure.

FIG. 1 is a figure which schematically shows a system configuration of a first embodiment of the present disclosure. With reference to FIG. 1, a system 10 according to the first embodiment of the present disclosure may include a terminal apparatus 100a and a server 100b. The terminal apparatus 100a is capable of communicating with Wi-Fi access points AP1 and AP2. Further, the terminal apparatus 100a may be capable of communicating with the server 100b via various types of wired or wireless networks. In this case, communication between the terminal apparatus 100a and the server 100b may be via either of the access points AP1 and AP2, or may be via a different channel.

The terminal apparatus 100a may be, for example, an information terminal such as a mobile phone (including a smartphone), a tablet-type terminal, a note-type or tablet-type Personal Computer (PC), a portable-type media player, or a portable-type game device. Alternatively, the terminal apparatus 100a may not have a display unit such as included in an information terminal, and may be a sensor log terminal which merely acquires and transmits or accumulates sensing data, a mobile router used for Wi-Fi communication or the like. When the terminal apparatus 100a moves by being carried by a user, the Wi-Fi access points with which the terminal apparatus 100a is capable of communicating will change along with the passing of time. While two access points AP1 and AP2 are illustrated in the illustrated example, the access points capable of communicating may be one or three or more in accordance with the case. Further, there may be cases where there are no access points capable of communicating.

In a number of embodiments of the present disclosure, "the terminal apparatus 100a is staying at some location" is detected, based on information which shows the wireless stations with which the terminal apparatus 100a is capable of communicating. Note that, in these embodiments, "the terminal apparatus 100a is staying at some location" is not the problem. That is, the terminal apparatus 100a is staying at some location may be detected regardless of position information of the terminal apparatus 100a and position information of this location. Therefore, in the present disclosure, the term of "location" has the meaning of an abstract location, for example, such as "where the terminal apparatus 100a was staying from 12:00 until 13:00", and may not necessarily be linked to specific position information, for example, such as latitude and longitude information.

In the first embodiment described hereinafter, Wi-Fi access points AP are detected as wireless stations with which the terminal apparatus 100a is capable of communicating. While it is desirable for an access point AP to be fixed to a specific location, it may not be necessary to recognize where this location is.

Here, the processes for recognizing a stay location of the terminal apparatus 100a may be executed within the terminal apparatus 100a, may be executed by the server 100b, or may be executed by distributing to the terminal apparatus 100a and the server 100b. In the case where the processes are executed within the terminal apparatus 100a, the system 10 may not include the server 100b, and the terminal apparatus 100a may not communicate with the server 100b. Note that, the server 100b may be implemented by a single server apparatus, or may be implemented by collaboration between a plurality of server apparatuses mutually connected by various types of wired or wireless networks. Further, a desktop-type PC or the like may be included in the server apparatus. The terminal apparatus 100a, or the one or a plurality of server apparatuses implementing the server 100b, may each be implemented by a hardware configuration of an information processing apparatus, which will be described later.

(1-2. Functional Configuration of the Information Processing Apparatus)

Figure 2:
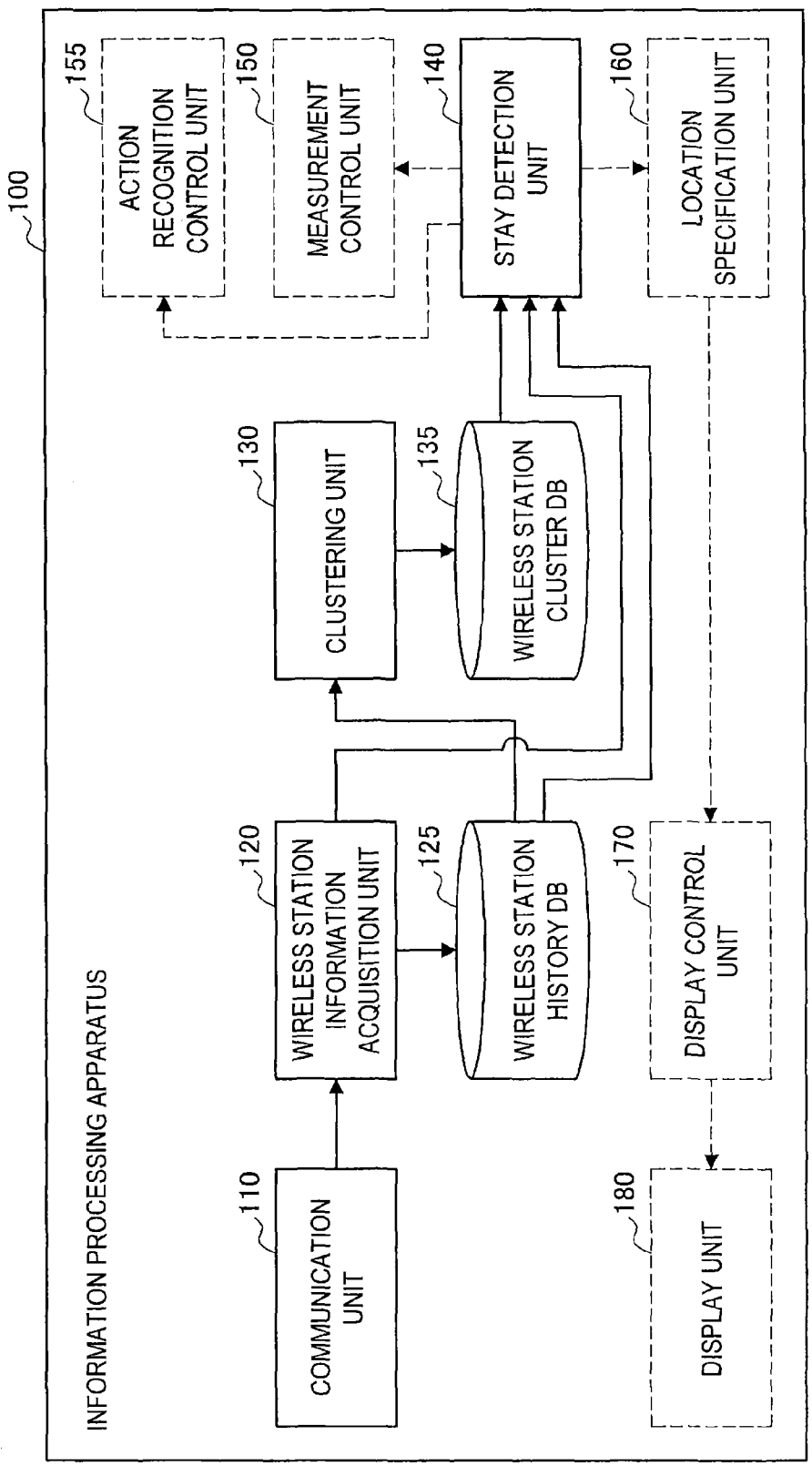
FIG. 2 is a block diagram which schematically shows a functional configuration of an information processing apparatus according to the first embodiment of the present disclosure.

FIG. 2 is a block diagram which schematically shows a functional configuration of an information processing apparatus according to the first embodiment of the present disclosure. The information processing apparatus 100 shown in FIG. 2 may be implemented by either the terminal apparatus 100a or the server 100b shown in FIG. 1. Alternatively, the information processing apparatus 100 may be an assembly of functions implemented by collaboration by the terminal apparatus 100a and the server 100b.

The information processing apparatus 100 includes a communication unit 110, a wireless station information acquisition unit 120, a wireless station history DB 125, a clustering unit 130, a wireless station cluster DB 135, and a stay detection unit 140. Further, the information processing apparatus 100 may include a measurement control unit 150, an action recognition control unit 155, a location specification unit 160, and/or a display control unit 170, and may additionally include a display unit 180. The communication unit 110 may be implemented by a communication apparatus included in the information processing apparatus 100. Further, the wireless station history DB 125 and the wireless station cluster DB 135 may be implemented by a storage apparatus included in the information processing apparatus 100. In the case where included in the information processing apparatus 100, the display unit 180 may be implemented by a display which is an output apparatus. Note that, audio output by a speaker may be used for providing information to a user, together with the display unit 180 or instead of this. Each of the units other than these may be implemented by software operated in accordance with programs by a processor such as a Central Processing Unit (CPU) included in the information processing apparatus 100.

In the case where implemented in the terminal apparatus 100a, the communication unit 110 executes Wi-Fi communication, and provides information which shows the access points capable of communicating to the wireless station information acquisition unit 120. Alternatively, in the case where implemented in the server 100b, the communication unit 110 receives information which shows the access points capable of communicating in Wi-Fi communication executed by the terminal apparatus 100a, via network communication from the terminal apparatus 100a, and provides this to the wireless station information acquisition unit 120. This information is called access point information (AP information) in the description hereinafter. The AP information may include, for example, an access point ID such as a basic service set identifier (BSSID).

The wireless station information acquisition unit 120 acquires AP information from the communication unit 110. Further, the wireless station information acquisition unit 120 acquires information which shows the time at which the access points are capable of communicating with the terminal apparatus 100a. More specifically, the wireless station information acquisition unit 120 may acquire a time stamp, which shows the time at which AP information has been acquired, from the communication unit 110 together with the AP information, or may internally generate a time stamp, which shows the time at which the AP information has been acquired from the communication unit 110. In addition, the wireless station information acquisition unit 120 may acquire meta-information which shows the state of the access points, such as a received signal strength indicator (RSSI) which shows the strength of radio waves that the terminal apparatus 100a has received from the access points, from the communication unit 110 together with the AP information. While the time interval of AP information acquired by the wireless station information acquisition unit 120 may be arbitrarily set, it is possible to detect a stay of the terminal apparatus 100a with a higher accuracy as the interval shortens. Information other than AP information acquired by the wireless station information acquisition unit 120 is accumulated in the wireless station history DB 125.

The clustering unit 130 specifies the time at which each of the access points are capable of communicating with the terminal apparatus 100a, from the AP information accumulated in the wireless station history DB 125, and generates a wireless station cluster by clustering the access points based on this time. More specifically, the clustering unit 130 may generate a wireless station cluster by one or a plurality of access points capable of simultaneously communicating with the terminal apparatus 100a. Here, "capable of simultaneously communicating" may have the meaning of being capable of communicating at a same time, or may have the meaning of being capable of communicating before and after a prescribed short time. Further, the clustering unit 130 may dynamically change the time width for determining "capable of simultaneously communicating", based on a distribution of the time at which each of the access points are capable of communicating. The clustering unit 130 stores information of the generated wireless station cluster in the wireless station cluster DB 135.

Further, the clustering unit 130 may calculate a reliability for each of the access points, and may cluster the access points based on this reliability. Here, the reliability may show the terminal apparatus 100a capable of communicating with each of the access points, and to what extent it can be reliable as information which shows a state in which the terminal apparatus 100a is staying at some location. For example, the reliability may be different, at access points capable of momentarily communicating at the time when a user carrying the terminal apparatus 100a is moving, and at access points capable of continuously communicating at the time when the user is staying at his or her home, office or the like. Further, the reliability may be different, at access points capable of communicating far from a stay location of the user with a weak radio wave strength, and at access points capable of communicating close to a stay location of the user with a strong radio wave strength. Therefore, the clustering unit 130 may selectively cluster access points with a high reliability, from among the access points shown by the AP information. Note that, a specific example of the calculation of the reliability will be described later.

In addition, the clustering unit 130 may generate a primary cluster (preliminary cluster) by clustering access points based on AP information acquired in a prescribed time period (for example, one day), and may successively update the wireless station cluster by combining the primary cluster with a secondary cluster (wireless station cluster) generated based on AP information acquired prior to the prescribed time period (for example, one day prior). Here, the prescribed time period is not limited to one day if it is a time period in which the regularity of the extent of an action of a user is shown, and weeks or months, for example, may be set as units. In the case where a wireless station cluster has not yet been generated in a past time period, the primary cluster may become the secondary cluster as it is.

In the above described combination of the primary cluster and the secondary cluster, in the case where the primary cluster includes access points in common with the secondary cluster, and the other access points included in this primary cluster are not in common with another secondary cluster, the primary cluster is combined with the secondary cluster.

That is, the other access points included in the primary cluster may be added to the secondary cluster. On the other hand, in the case where the primary cluster includes access points in common with a plurality of secondary clusters, these plurality of secondary clusters are merged and a new secondary cluster is formed, and the other access points included in the primary cluster may be added to this new secondary cluster. Further, in the case where the access points included in the primary cluster are not in common with the secondary cluster, a new secondary cluster may be generated which corresponds to this primary cluster. By such processes, the access points included in the secondary clusters (wireless station clusters) can be prevented from overlapping, and the process of stay detection, which will be described later, can be simplified. Note that, a specific example of the combination process of clusters will be described later.

Further, the clustering unit 130 may be a combination of the primary cluster and the secondary cluster, and may consider the reliability of each of the access points. This reliability may be in common with the above described reliability (reliability which may be used at the time of the generation of the primary cluster), for the point in which it may show the terminal apparatus 100a capable of communicating with each of the access points, and to what extent it can be reliable as information which shows a state in which the terminal apparatus 100a is staying at some location. However, since the secondary cluster is a cluster which includes access points already extracted as those included in the primary cluster in the past, the calculation method of the reliability may be different at the time of the generation of the primary cluster and at the time of the combination of the clusters. More specifically, the reliability at the time of the combination of the clusters may be calculated based on the total time or frequency at which each of the access points are capable of communicating with the terminal apparatus 100a. The time or frequency here may be calculated, for example, by referring to AP information stored in the wireless station history DB 125, or each of the access points may be indirectly referred to by the number of times extracted as being included in the primary cluster, which is included in information of the wireless station clusters stored in the wireless station cluster DB 135.

In the case where the reliability of access points is calculated at the time of cluster combination, the clustering unit 130 may skip collation with the access points included in the primary cluster, for access points with a low reliability from among the access points included in the secondary cluster. In this case, these access points may be added to the secondary cluster in accordance with a collation result of other access points with a high reliability. As a result of this, in the case where the access points with a low reliability are added to a secondary cluster different to the secondary cluster up until that time, these access points may be removed from the original secondary cluster. In this way, for example, by having access points with a low reliability (while not to the extent of being excluded from the target of clustering, access points which are only capable of communicating with a comparatively short time or with a weak radio wave strength) included in a different primary cluster each time, the secondary cluster can be prevented from endlessly expanding. Similarly, in the case where the reliability of access points of the primary cluster is low, based on the reliability calculated at the time of generating the primary cluster, the clustering unit 130 may skip collation of the access points.

The stay detection unit 140 detects a state in which the terminal apparatus 100a is staying at some location, based on information of the wireless station clusters stored in the wireless station cluster DB 135. More specifically, the stay detection unit 140 detects a state in which the terminal apparatus 100a is capable of communicating with the access points included in a wireless station cluster as a state in which the terminal apparatus 100a is staying at a location corresponding to this wireless station cluster. The stay detection unit 140 may detect, for example, a stay state of the terminal apparatus 100a in real-time by acquiring, from the wireless station information acquisition unit 120, the latest AP information (showing the access points with which the terminal apparatus 100a is capable of communicating at the present time) acquired by the terminal apparatus 100a. Further, the stay detection unit 140 may detect a stay state of the terminal apparatus 100a after the fact by acquiring, from the wireless station history DB 125, AP information (showing a history of the access points with which the terminal apparatus 100a has been capable of communicating) acquired from the terminal apparatus 100a in the past. Here, the AP information used for the detection of a stay by the stay detection unit 140, and the AP information used for the generation of a wireless station cluster by the clustering unit 130, may overlap each other. That is, in the information processing apparatus 100, a wireless station cluster may be generated by the processes of the clustering unit 130, and a stay state of the terminal apparatus 100a may be detected on the basis of the wireless station cluster by the stay detection unit 140, for AP information acquired in a same time period.

The measurement control unit 150 controls a measurement operation by the terminal apparatus 100a, based on a result of a real-time stay detection by the stay detection unit 140. More specifically, the measurement control unit 150 stops a measurement operation (or extends an operation interval) at the time when the terminal apparatus 100a is capable of communicating with access points (or an access point group) corresponding to any of the wireless station clusters, and may restart the measurement operation (or shorten the operation interval) at the time when the terminal apparatus 100a is no longer capable of communicating with the access points (or the access point group). For example, in the case where a user carrying the terminal apparatus 100a is staying at some location, since it is assumed that a change of the position of the user will be small, power consumption due to the measurement operation can be restrained, without lowering the accuracy of position detection of the user, by having the measurement control unit 150 stop the measurement operation or extend the interval of the measurement operation more than that while moving.

For example, in the case where measurements are executed by using GPS, power will be consumed in the reception of radio waves of GPS. Further, the location at which the user stays will often by inside a building where receiving radio waves of GPS is difficult. Therefore, if the operations of a GPS receiver can be stopped (or the operation interval extended) during a stay of the user, there will be a high possibility that excessive power for receiving radio waves difficult to be received by the GPS reception device can be prevented from being consumed. Further, in the case where measurements are executed by using Wi-Fi communication, since power is consumed in operations for converting information of the access points into latitude and longitude information, and in accessing external databases, the power consumption can be restrained by stopping the measurement operation (or extending the operation interval). Note that, the measurement operation in the terminal apparatus 100a is not limited to that using GPS or Wi-Fi communication, and may use, for example, another Navigation Satellite System (NSS).

The action recognition control unit 155 controls the action recognition operation by the terminal apparatus 100a, based on a result of a real-time stay detection by the stay detection unit 140. The action recognition operation by the terminal apparatus 100a is an operation, for example, which recognizes operations of a user, boarding of a vehicle or the like by using a detection result of various types of sensors such as an acceleration sensor of the terminal apparatus 100a, in addition to position information acquired by using GPS, Wi-Fi communication or the like. For example, the action recognition control unit 155 may stop the action recognition operation (or extend the operation interval) at the time when the terminal apparatus 100a is capable of communicating with access points (or an access point group) corresponding to any of the wireless station clusters, and may restart the action recognition operation (or shorten the operation interval) at the time when the terminal apparatus 100a is no longer capable of communicating with the access points (or the access point group). In the case where a user carrying the terminal apparatus 100a is staying at some location, since it is assumed that the possibility of the user boarding a vehicle will be low, power consumption due to the action recognition operation can be restrained, without lowering the accuracy of action recognition of the user, by having the action recognition control unit 155 stop the action recognition operation, or extend the action recognition operation more than that while moving.

The location specification unit 160 associates the stay location detected by the stay detection unit 140 with position information. As described above, the stay location detected by the stay detection unit 140 is an abstract location specified based on the wireless station clusters, and is not linked to specific position information. For example, in the above described case of the control of GPS, since it may not be necessary to associate the stay location with position information, in the case where it may not be necessary to specify the location itself in action recognition or the like, the location specification unit 160 may not be included. However, for example, in the case such as a display of the stay location on a screen, which will be described later, it will be useful for the position of the stay location to be specified. In such a case, the location specification unit 160 is included, and position information acquired by measurements using GPS or Wi-Fi communication or the like by the terminal apparatus 100a is associated with the stay location, for example, based on the time at which this position information was acquired. Alternatively, the location specification unit 160 may associate position information designated by an input operation by a user with the stay location.

The display control unit 170 causes the display unit 180 to display an image, in which the stay location detected by the stay detection unit 140 is displayed on a map, based on the position information associated by the location specification unit 160. The map here is not limited to a two-dimensional map constituted based on latitude and longitude information, and also includes a three-dimensional map or the like which represents the floor of a building. In the case where the display unit 180 is included in the information processing apparatus 100, the display control unit 170 causes an image to be displayed by internally controlling the display unit 180. Alternatively, in the case where a display unit is not included in the information processing apparatus 100 (for example, the server 100b), and is included in another apparatus (for example, the terminal apparatus 100a), the display control unit 170 causes an image to be displayed by controlling the display unit via a communication apparatus. Note that, an example of an image, in which the stay location is displayed on a map, will be described later.

(1-3. Example of AP Information)

Figure 3:
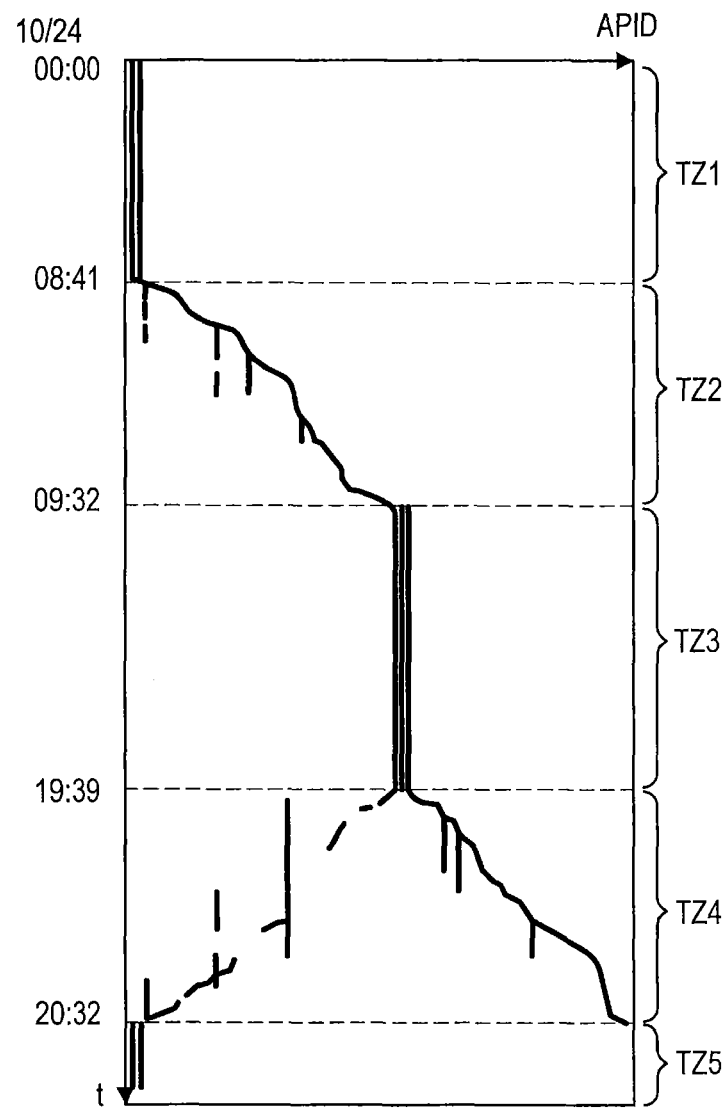
FIG. 3 is a figure which shows an example of the acquisition of AP information in the first embodiment of the present disclosure.

FIG. 3 is a figure which shows an example of the acquisition of AP information in the first embodiment of the present disclosure. In the information processing apparatus 100 according to the present embodiment, the wireless station information acquisition unit 120 acquires AP information which shows access points with which the terminal apparatus 100a is capable of communicating. The AP information may include, for example, an access point ID such as BSSID. FIG. 3 is a graph which shows an access point ID (APID) acquired in one day in a time series.

In the illustrated example, the same APID (set to A group) is continuously acquired, from 0:00 until 8:41 (time slot TZ1). From this, in the time slot TZ1, it is assumed that a user possessing the terminal apparatus 100a is staying at some location (set to location A) capable of communicating with the access points of the A group.

The APID acquired at 8:41 changes, and afterwards a new APID is successively acquired until 9:32 (time slot TZ2). The APID acquired in this time slot TZ2 will not be acquired again in a comparatively short time. From this, in the time slot TZ2, it is assumed that the user is moving from location A to another location.

From 9:32 until 19:39 (time slot TZ3), an APID (set to B group) different to that acquired in the time slot TZ1 is continuously acquired. From this, in the time slot TZ3, it is assumed that the user is staying at some location (set to location B) capable of communicating with the access points of the B group or the like. Since the access points of the A group and the access points of the B group are different, it is assumed that location A and location B are different locations.

The APID acquired at 19:39 changes again, and afterwards a new APID is additionally acquired until 20:32 (time slot TZ4), and a part of the APID acquired in the time slot TZ2 is acquired again. From this, in the time slot TZ4, it is assumed that the user is moving by a route, in which at least of a part overlaps with the route of movement in the time slot TZ2, from location B to another location.

Note that, the acquired APID may be different, even if the user moves by the same route in the time slot TZ2 and the time slot TZ4 (in the illustrated example, the user actually moves by the same route). Here, in the case where the user moves at a speed such as riding a train, the time capable of communicating with each of the access points will be short, and so it may be necessary for all of the access points having a communication area on the movement route to be detected, in accordance with the period of APID acquisition.

From 20:32 onwards (time slot TZ5), an APID of the A group the same at that acquired in the time slot TZ1 is continuously acquired. From this, in the time slot TZ5, it is assumed that the user returns to location A, which is the same as that stayed in the time slot TZ1, and is staying there again.

The information processing apparatus 100 according to the present disclosure clusters access points, for example, based on AP information acquired such as described above, and detects a stay state of the terminal apparatus 100a. In the illustrated example, the same access points are capable of continuously communicating, in the time slots TZ1, TZ3 and TZ5. Therefore, in the processes of the clustering unit 130, respective clusters may be generated for the A group of the time slot TZ1, the B group of the time slot TZ3, and the A group of the time slot TZ5. Based on this, the stay detection unit 140 can detect that the terminal apparatus 100a has stayed at some location in the time slots TZ1, TZ3 and TZ5. Further, in the case where the combination process of clusters such as described above is executed, the clusters of the two A groups of the time slots TZ1 and TZ5 may be merged. Therefore, the stay detection unit 140 can detect that the terminal apparatus 100a has stayed at location A in the time slots TZ1 and TZ5, and has stayed at a different location B in the time slot TZ3. In addition, when this detection result is applied to a living time slot of a general user, it is assumed that the location A at which the terminal apparatus 100a has stayed in the time slots TZ1 and TZ5 is the user's home, and the location B stayed in the time slot TZ3 is an office. In this assumption, the specific locations of the home and the office may not be specified.

(1-4. Example of the Clustering Process)

Figure 4:
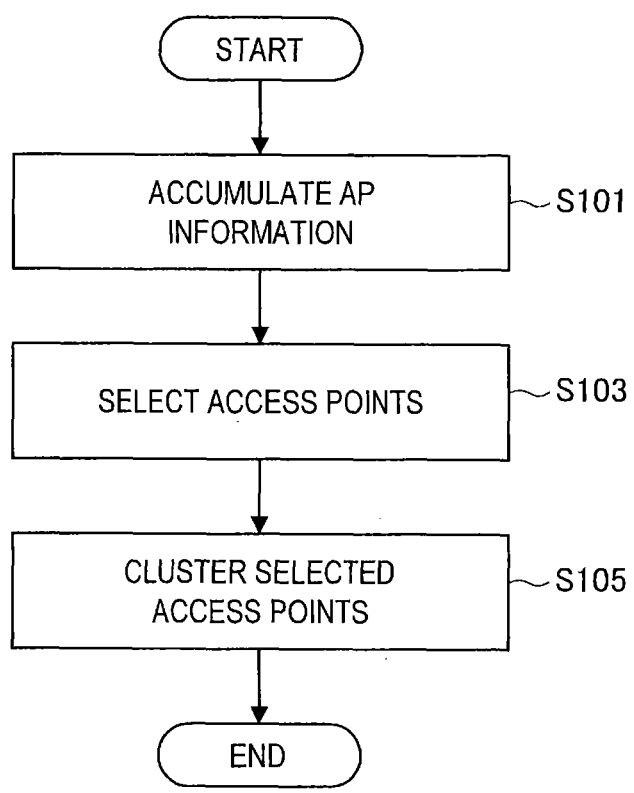
FIG. 4 is a flow chart which shows an example of the process of clustering in the first embodiment of the present disclosure.

FIG. 4 is a flow chart which shows an example of the process of clustering in the first embodiment of the present disclosure. The process is executed in the above described information processing apparatus 100. First, the wireless station information acquisition unit 120 acquires, from the communication unit 110, information (AP information) which shows the access points with which the terminal apparatus 100a is capable of communicating, and accumulates it in the wireless station history DB 125 (step S101). Here, the AP information is accumulated over a time period of an extent sufficient for the clustering unit 130 to generate wireless station clusters by clustering. The time period in which the AP information is accumulated may be one day, for example, or may be longer than this.

Next, the clustering unit 130 selects the access points to be clustered, based on the AP information accumulated in the wireless station history DB 125 (step S103). Here, the clustering unit 130 selects, for example, AP information with a higher reliability, as access points of a clustering target, based on a reliability calculated for each of the access points. Note that, a specific example of the calculation of the reliability at the time of selection will be described later.

Next, the clustering unit 130 clusters the selected access points (step S105). As described above, the clustering here is clustering based on the time at which each of the access points are capable of communicating with the terminal apparatus 100a. The clustering unit 130 may classify access points capable of communicating with the terminal apparatus 100a at the same time into a same cluster. Further, the clustering unit 130 may classify access points capable of communicating before and after a prescribed short time into a same cluster. In addition, the clustering unit 130 may dynamically change the width of the prescribed short time, based on a distribution of the time at which each of the access points are capable of communicating.

For example, by a process such as described above, the access points are clustered, and a wireless station cluster is generated (in the case of a combination process of clusters, which will be described later, a primary cluster (preliminary cluster) is generated). Hereinafter, the selection process of access points shown in step S103 will be additionally described in detail by using an example.

(Selection Process of Access Points)

As described above, the clustering unit 130 calculates a reliability for each of the access points, and determines the access points of a clustering target based on this reliability. The reliability is calculated, for example, based on the time at which the access points are capable of communicating with the terminal apparatus 100a. In this case, the clustering unit 130 may set a higher reliability for the access points which are capable of communicating for a longer time. The time capable of communicating may be (1) the total time each of the access points are capable of communicating in a prescribed time period, or (2) the longest time at which a state capable of communicating with each of the access points is continued in a prescribed time period.

Further, the reliability may be calculated based on (3) the frequency at which the access points are capable of communicating with the terminal apparatus 100a. In this case, the clustering unit 130 may set a higher reliability for the access points capable of communicating a greater number of times in a prescribed time period. The number of times capable of communicating is not limited to the time period in which the latest AP information is accumulated, and may be counted by also including a time period prior to this.

In addition, in the case where (4) an operation which designates access points from a user is provided to the terminal apparatus 100a, the clustering unit 130 may set a higher reliability to the access points designated by this operation. Further, the clustering unit 130 may calculate the reliability based on (5) the strength of signals from each of the access points received by the terminal apparatus 100a, and may set a higher reliability to the access points with stronger signals.

The clustering unit 130 selects access points, for example, based on the reliability calculated by arbitrarily combining each of the above described (1) to (5). For example, in the case where (A) the time capable of communicating is set to a standard, access points may be selected based on the reliability calculated by the above described (1), (2) and (5). Further, in the case where (B) the frequency capable of communicating is set to a standard, access points may be selected based on the above described (3), (4) and (5). In the case where (C) external input information is used, access points may be selected based on the above mentioned (4). Hereinafter, respective examples will be additionally described.

(A) In the Case where the Time Capable of Communicating is Set to a Standard

In the case where the time at which the terminal apparatus 100a is capable of communicating with an access point is long, it can be assumed that a user carrying the terminal apparatus 100a has stayed for a long time stay near to this access point. For example, an access point corresponding to a location at which the user stays a long time, such as home or the office, can be extracted by a selection in which time is set to a standard. More specifically, in the case where the time capable of communicating of an access point is equal to or more than a prescribed threshold, or is a high rank (for example, represented by a prescribed % or the like) compared to the time capable of communicating of all the access points, this access point may be selected as a clustering target.

(B) In the Case where the Frequency Capable of Communicating is Set to a Standard In the selection of the above described (A), access points with a short time capable of communicating with the terminal apparatus 100a are excluded from a clustering target. However, access points corresponding to locations at which the user stays a short time while visiting with a high frequency, such as a cafe or a convenience store, for example, may be included within such access points. Such access points can be extracted, for example, by a selection in which frequency is set to a standard. More specifically, first, access points are extracted, from among the access points not extracted by the selection of (A), in which the time capable of communicating with the terminal apparatus 100a is long to some extent (a threshold equal to or less than the threshold in (A), or a high rank compared to within the access points not extracted by (A)). In addition, those in which the number of times capable of communicating with the terminal apparatus 100a in the past is equal to or more than a prescribed number of times, or those in which the total of the time capable of communicating is equal to or more than a prescribed threshold, are selected as a target of clustering.

(C) in the Case where External Input Information is Used.

In addition to automatically selecting access points with a high possibility of corresponding to a stay location of a user from AP information accumulated in the wireless station history DB 125, such as in the above described selections of (A) and (B), access points may also be selected based on an operation of a user, information provided from an external service or the like. For example, in the case where information which shows staying at some location (for example, "at home now", "at the office now" or the like) has been input to the terminal apparatus 100a by a user, the access points capable of communicating with the terminal apparatus 100a at this time may be selected as a target of clustering. Further, in the case where information of the access points used by the user is provided in advance, by a communication service or the like used by the terminal apparatus 100a, for example, these access points may be automatically set to a target of clustering in the case where they become capable of communicating. By using such information provided from a user or an external service, it becomes possible to perform a selection as a target of clustering, for example, even if there are access points in a location where the user stays for the first time.

Note that, the selection of (C) may be combined with the above described selection of (A) or (B). In this case, in the case where access points extracted by the selection of (A) or (B) are also extracted by the selection of (C), a higher reliability can be set for these access points than for access points extracted by only the selection of (A) or (B), and they can be preferentially used, for example, in a combination process of clusters, which will be described later.

Further, in the above described selections of (A) and (B), access points with a weak signal capable of communicating can be excluded, by calculating a reliability by combining the strength of signals from each of the access points received by the terminal apparatus 100a of the above described (5), and the region covered by the wireless station clusters can be prevented from becoming too wide.

Lastly, an example of the selections using the above mentioned (A) and (B) will be described by using a numerical equations. In this example, AP information is selected by setting 24 hours (one day) as units. A score $Score_{AP}$ of the reliability used for selection may be calculated by weighting and adding a score of the past m days portion, such as shown in Equation 1. Note that, $W^{day}$ is a weight coefficient of the score of each day, are becomes smaller as the days pass. Further, $SubScore_{AP}^{day}$ is a score of the reliability of each day.

[Math 1]

$$Score_{AP} = \sum_{day=0}^{m} \left( W^{day} \times SubScore_{AP}^{day} \right) \quad \text{(Equation 1)}$$

Here, $SubScore_{AP}^{day}$ may be obtained such as in Equation 2, by a signal strength $Str_{AP}$ of the access points, a time total $Time_{AP}^{total}$ capable of communicating of the access points, a maximum value of the time $Time_{AP}^{cont}$ capable of continuously communicating of the access points, and respective weigh coefficients $W^{total}$ and $W^{cont}$.

[Math 2]

$$SubScore_{AP}^{day} = \int_{0}^{24hour} Str_{AP} dt \times (W^{total} \times Time_{AP}^{total} + W^{cont} \times Time_{AP}^{cont}) \quad \text{(Equation 2)}$$

Note that, in the above described example, while access points constituting a wireless station cluster are selected based on the reliability, in another embodiment, for example, all of the access points may become a target of clustering. In this case, the access points which are to become a nucleus of a wireless station cluster may be selected based on the reliability, and the wireless station cluster may be constituted by access points which become capable of communicating at the same time as, or at a time close to, the access points which are to become a nucleus.

(1-5. Example of the Cluster Combination Process)

Figure 5:
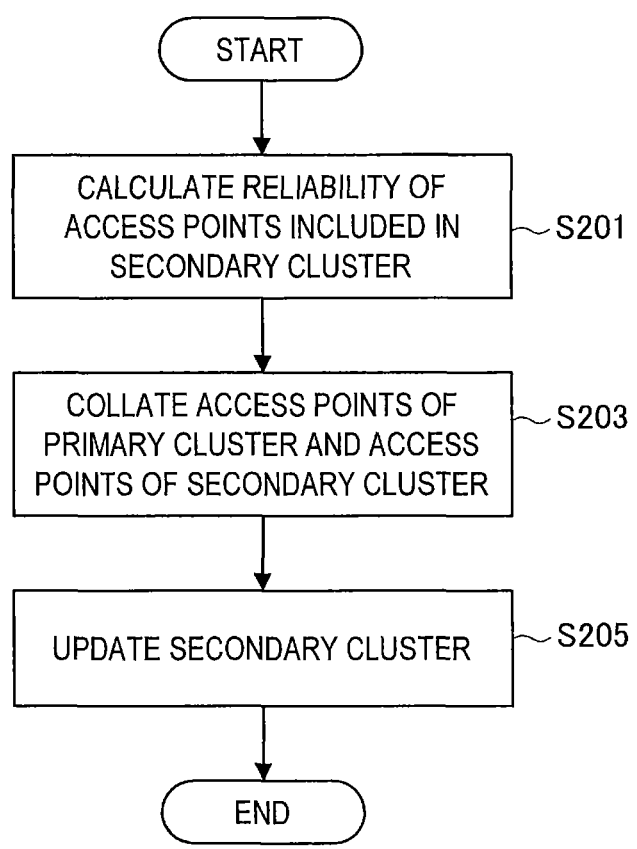
FIG. 5 is a flow chart which shows an example of a cluster combination process in the first embodiment of the present disclosure.

FIG. 5 is a flow chart which shows an example of a cluster combination process in the first embodiment of the present disclosure. As described above, the clustering unit 130 of the information processing apparatus 100 may generate a primary cluster (preliminary cluster) by clustering access points based on AP information acquired in a prescribed time period (for example, one day), and may successively update the wireless station cluster by combining the primary cluster with a secondary cluster (wireless station cluster) generated based on AP information acquired prior to the prescribed time period (for example, one day prior).

Here, the wireless station cluster generated as a secondary cluster may include overlapping access points. Since the primary cluster may be generated based on the time at which each of the access points are capable of communicating with the terminal apparatus 100a, a plurality of access points capable of communicating at different times may be included in a plurality of clusters. The access points included in the secondary cluster (wireless station cluster) can be prevented from overlapping, if the primary cluster including common access points is combined with the secondary cluster. By having wireless station clusters not include overlapping access points, wireless station clusters may be uniquely decided for each of the access points, and the process of stay detection by the stay detection unit 140 may be simplified.

In the cluster combination process, first, the clustering unit 130 calculates a reliability of the access points included in the already generated secondary cluster (step S201). Here, the clustering unit 130 may calculate the reliability by a standard different to that at the time of the generation of the primary cluster. Note that, a specific example of the reliability at the time of cluster combination will be described later.

Next, the clustering unit 130 collates the access points included in the primary cluster and the access points included in the secondary cluster (step S203). In this way, as will be described later, for example, it is determined whether the newly generated primary cluster is to be included in the existing secondary cluster, whether a new secondary cluster not included in the existing secondary cluster is to be added, or whether the existing secondary cluster is to be merged.

Here, the clustering unit 130 may determine whether or not each of the access points of the secondary cluster collate with the access points of the primary cluster, based on the reliability calculated in step S201. Therefore, in step S203, all of the access points included in the primary cluster and the secondary cluster may not necessarily be collated, and the access points with a high reliability may be limitedly collated.

Next, the clustering unit 130 updates the secondary cluster, based on the result of collating the access points of the primary cluster and the access points of the secondary cluster (step S205). At this time, in addition to the secondary cluster being updated itself, additional information, such as an appearance frequency of each of the access points included in the secondary cluster (number of times each of the access points are extracted as being included in the primary cluster), may also be updated.

(Reliability at the Time of Cluster Combination)

As described above, the clustering unit 130 may calculate the reliability of access points included in the secondary cluster, and may determine whether or not the access points are to be used for the determination of a combination of clusters based on this reliability. The reliability here may be calculated, for example, based on the frequency at which each of the access points are capable of communicating with the terminal apparatus 100*a*. The frequency is calculated through a time period in which AP information used for the generation and updating of the secondary cluster is accumulated. Further, the number of times most recently capable of communicating may be more significantly reflected in the frequency. Here, since there will be cases where access points are removed or are moved, there is the possibility that the access points to be detected may change, even if a movement pattern of a user does not change.

Further, the clustering unit 130 may calculate the reliability of access points included in the secondary cluster based on a contribution to the cluster of each of the access points. The contribution to the cluster of the access points is calculated, for example, by whether or not each of the access points are to be used for the determination at the time when combining a new primary cluster with the secondary cluster. Since it can be said that many of the access points used for the determination at the time when combining the primary cluster with the secondary cluster are characteristic access points of this secondary cluster, it is assumed that they will have a high reliability.

Note that, the clustering unit 130 may calculate the reliability of access points included in the secondary cluster the same as the reliability used for selecting access points at the time of the generation of the primary cluster. In this case, the clustering unit 130 may calculate the time or number of times at which the access points are capable of communicating, through a time period in which AP information used for the generation or updating of the secondary cluster is accumulated, may calculate an average value of the strength of radio waves from the access points, or may determine whether or not information specifying these access points has been provided to a user or an external service.

(Specific Example of Cluster Combination)

FIG. 6 to FIG. 9 are figures which show specific examples of the cluster combination process in the first embodiment of the present disclosure. In the present embodiment, the secondary cluster may be updated such as in any of the following four examples, for example, as a result of a collation of access points with a newly generated primary cluster. Note that, in the following examples, each of the access points will be set to a sufficiently high reliability.

Figure 6:
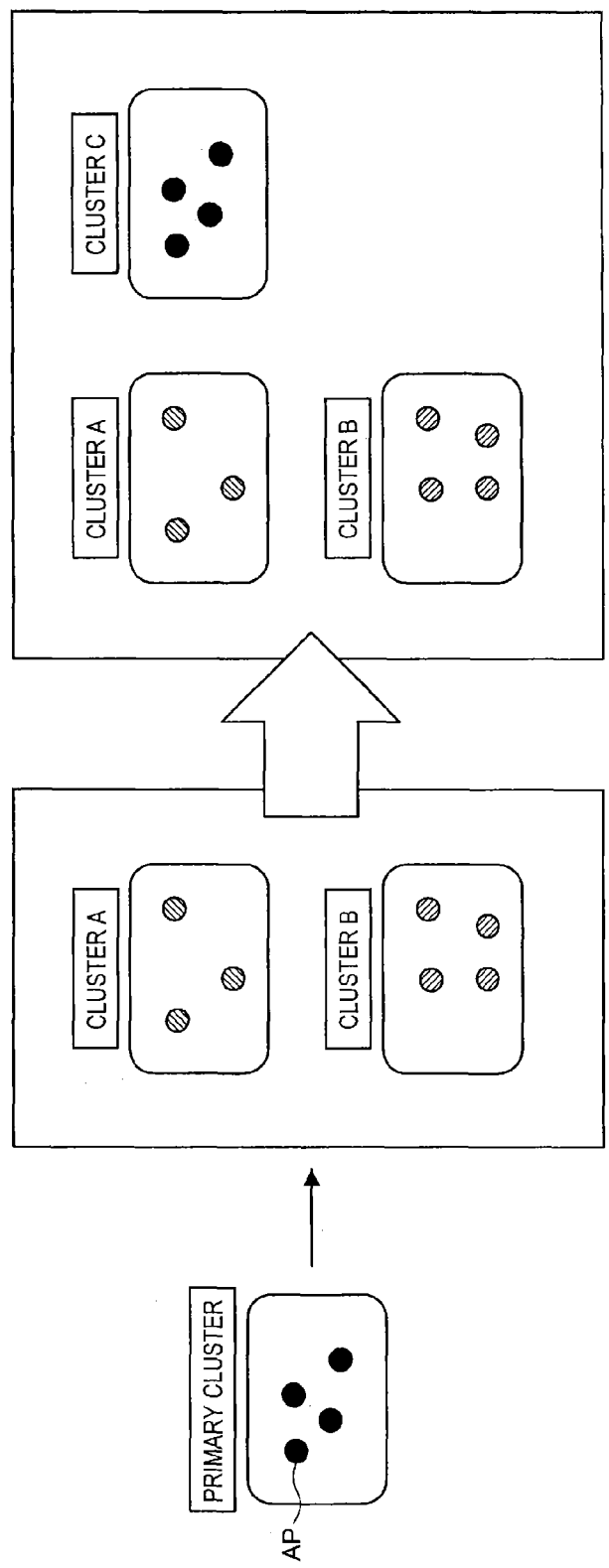
FIG. 6 is a figure which shows a specific example of a cluster combination process in the first embodiment of the present disclosure.

An example is shown in FIG. 6 in which a newly generated primary cluster includes only access points (unknown access points) not included in any of the secondary clusters (cluster A, cluster B). In this case, by a combination process of the clusters, a secondary cluster (cluster C) which includes the unknown access points included in this primary cluster may be newly generated.

Figure 7:
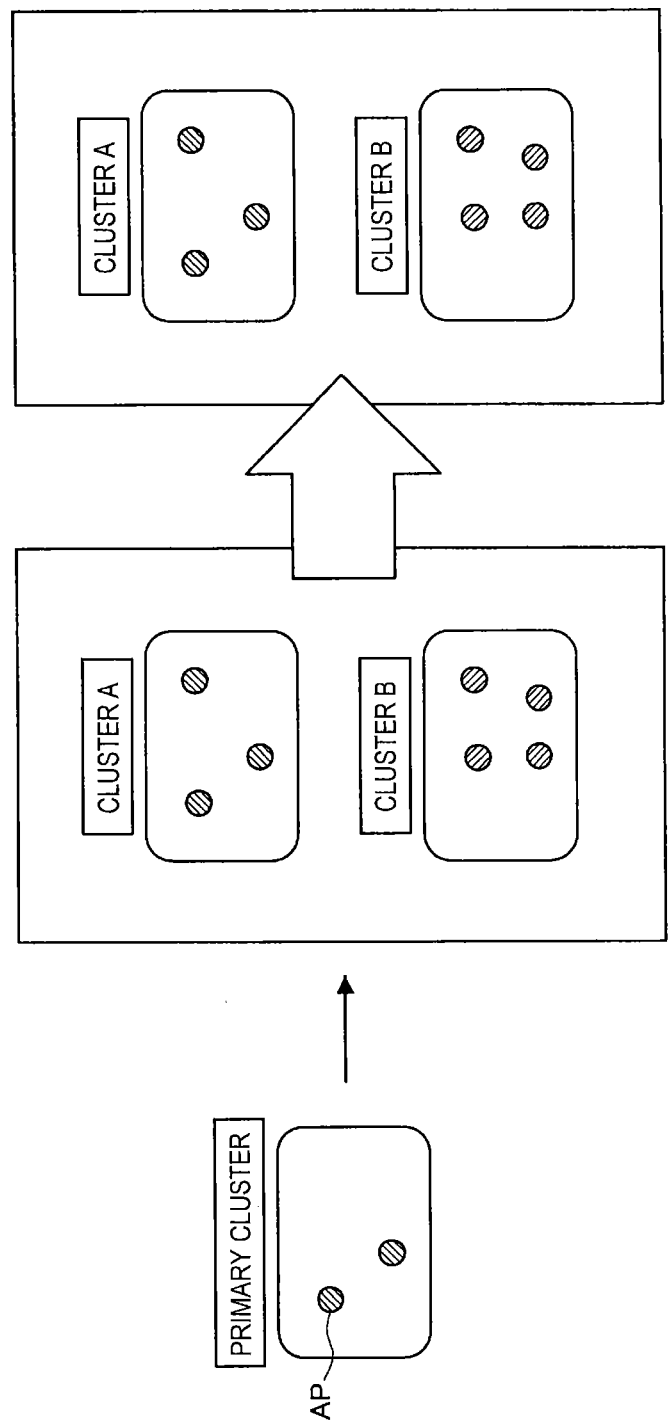
FIG. 7 is a figure which shows a specific example of a cluster combination process in the first embodiment of the present disclosure.

An example is shown in FIG. 7 in which a newly generated primary cluster includes only access points included in a certain secondary cluster (cluster A). In this case, by a combination process of the clusters, this primary cluster is combined with the secondary cluster (cluster A) in which the access points are common. As a result, there is no change in the access points included in the secondary clusters (cluster A, cluster B). However, an appearance frequency of the access points in the secondary cluster (cluster A) (number of times each of the access points are extracted as being included in the primary cluster) may increase.

Figure 8:
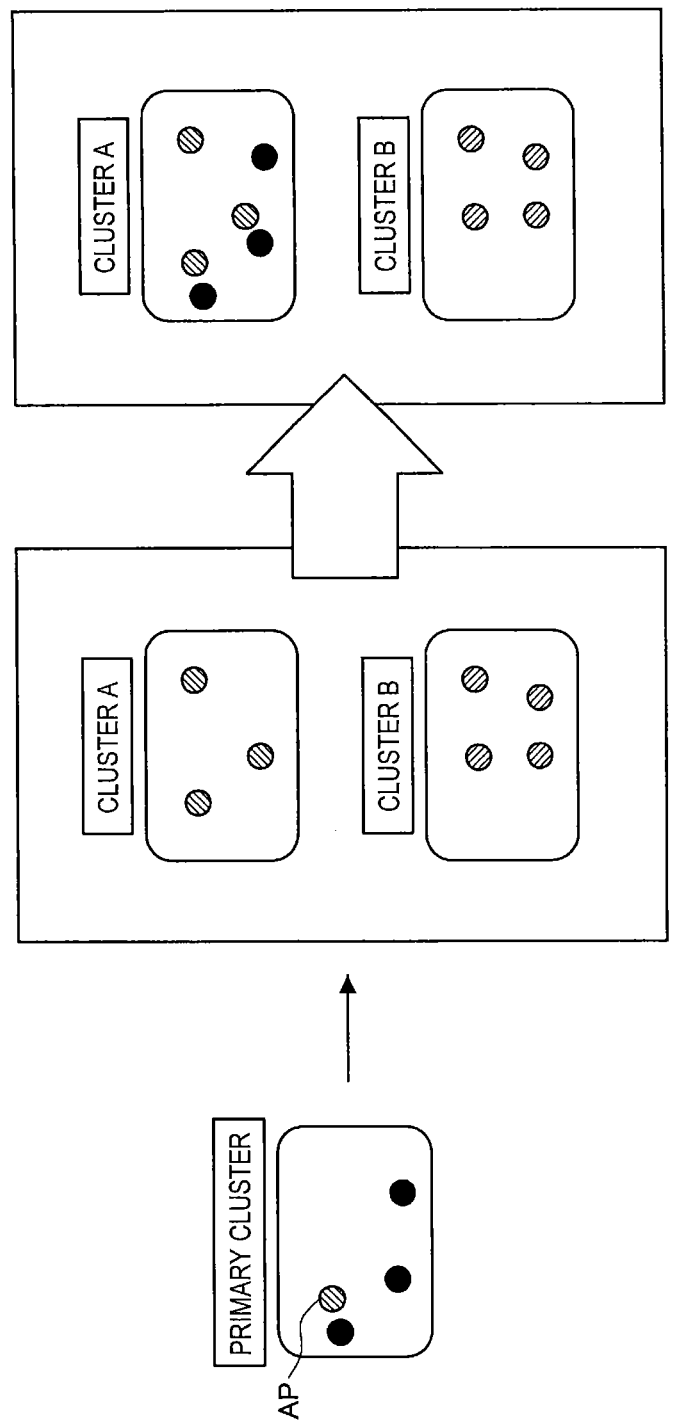
FIG. 8 is a figure which shows a specific example of a cluster combination process in the first embodiment of the present disclosure.

An example is shown in FIG. 8 in which a newly generated primary cluster includes access points included in a certain secondary cluster (cluster A), and access points (unknown access points) not included in any of the secondary clusters. In this case, by a combination process of the clusters, this primary cluster is merged with the secondary cluster (cluster A) in which the access points are common, and the unknown access points are also added to this secondary cluster (cluster A).

Figure 9:
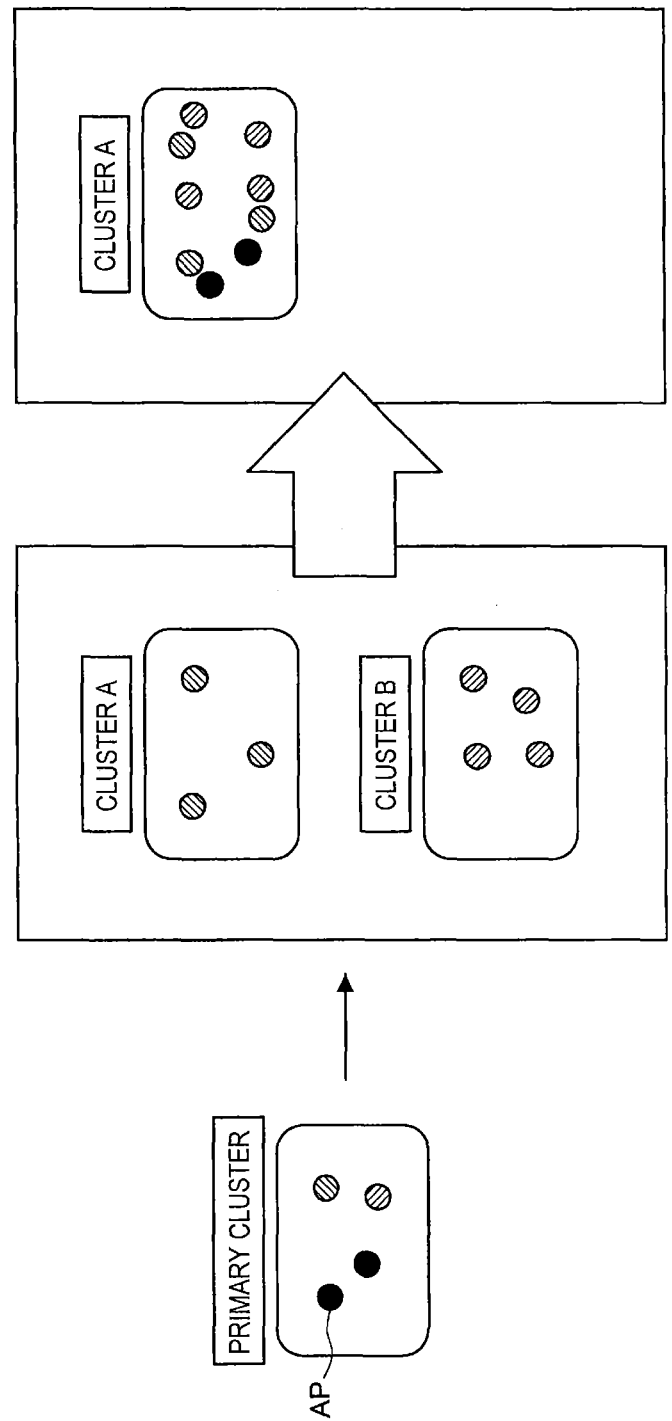
FIG. 9 is a figure which shows a specific example of a cluster combination process in the first embodiment of the present disclosure.

An example is shown in FIG. 9 in which a newly generated primary cluster includes access points included in a certain secondary cluster (cluster A), and access points included in a different secondary cluster (cluster B). In this case, by a combination process of the clusters, these secondary clusters (cluster A, cluster B) which include access points in common with this primary cluster are merged and become a new secondary cluster (cluster A), and the primary cluster is combined with this secondary cluster. In the case where unknown access points are included in the primary cluster, the unknown access points are also added to the new secondary cluster.

(1-6. Example of Stay State Detection)

Figure 10:
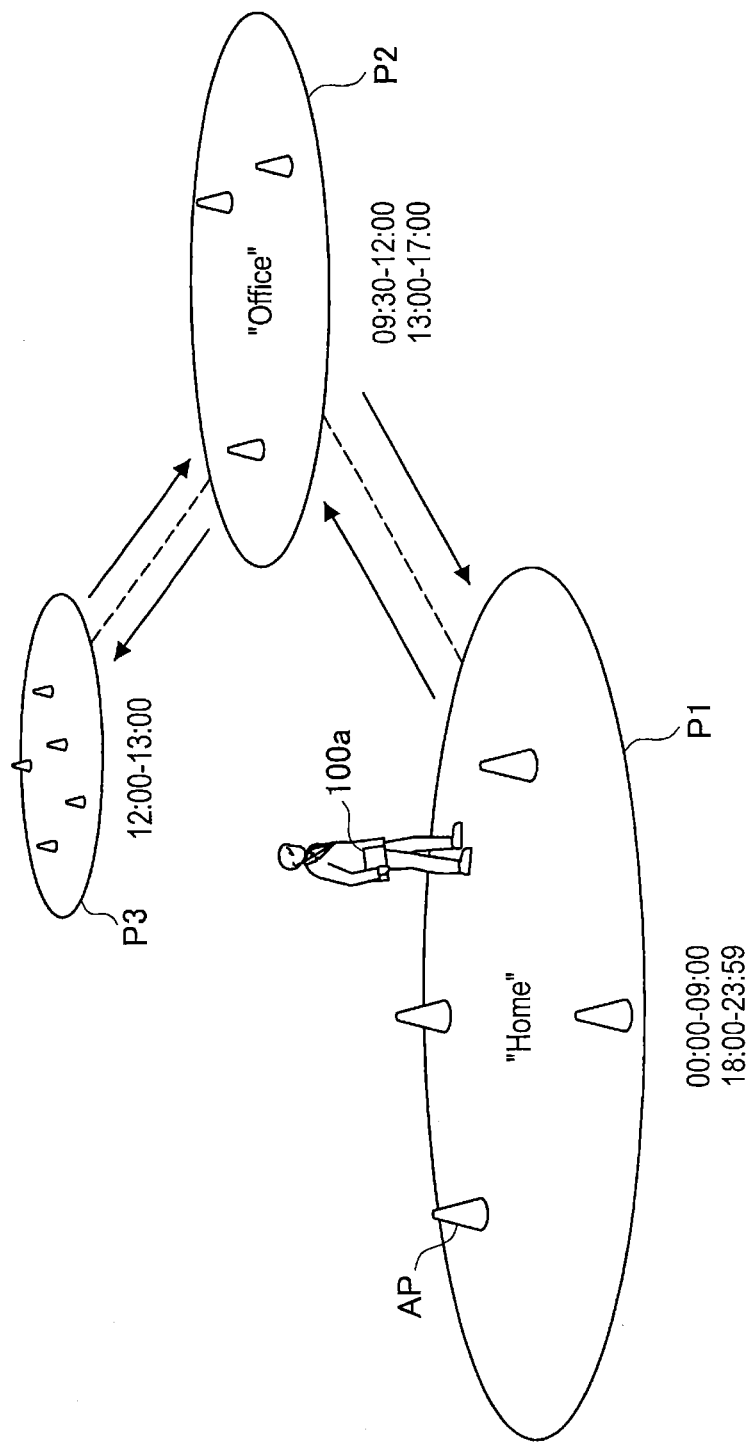
FIG. 10 is a figure which shows an example of a stay state detection result in the first embodiment of the present disclosure.

FIG. 10 is a figure which shows an example of a stay state detection result in the first embodiment of the present disclosure. In the illustrated example, a stay at the three locations of P1 to P3 is detected, in association with wireless station clusters generated based on AP information. Each of the stay locations correspond to one or a plurality of access points (AP) included in the wireless station clusters, and the access points included in each of the wireless station clusters do not overlap. Therefore, the stay detection unit 140 can determine whether a user of the terminal apparatus 100*a* is staying at some stay location, or is moving between stay locations, based on the access points with which the terminal apparatus 100*a* is capable of communicating.

As described above, the detection of a stay by the stay detection unit 140 may be executed in real-time based on information of the access points with which the terminal apparatus 100*a* is capable of communicating at the present time, or may be executed after the fact based on a history of the access points with which the terminal apparatus 100*a* has been capable of communicating.

(Real-Time Stay Detection)

In the case of detecting a stay in real-time, it is possible for the stay detection unit 140 to recognize, with a short time delay, that a user carrying the terminal apparatus 100*a* has arrived at one of the stay locations, or has departed from this stay location. In the case of the example shown in FIG. 10, the stay detection unit 140 determines that the user has arrived at one of the stay locations, at the time when the terminal apparatus 100*a* is capable of communicating with the access points (or an access point group) corresponding to any of location P1 to location P3, and determines that the user has departed from the stay location, at the time when the terminal apparatus 100a is no longer capable of communicating with the access points (or the access point group). Further, in the case where the user departs from some stay location, and afterwards does not arrive at another stay location, it is determined that the user is moving between stay locations. In this way, for example, it is possible to provide information related to the stay location in real-time to the user, and to save power by controlling the operations of the GPS receiver of the terminal apparatus 100a.

(Stay Detection after the Fact)

On the other hand, in the case of detecting a stay after the fact (including the case in which a detection result is processed as history in real-time), it is possible for the stay detection unit 140 to specify the time at which a user carrying the terminal apparatus 100a has stayed at each of the stay locations. In the case of the example shown in FIG. 10, the stay detection unit 140 specifies the time at which the user has stayed at each of the stay locations, based on the time at which the terminal apparatus 100a has been capable of communicating with the access points (or an access point group) corresponding to any of location P1 to location P3, and the time at which the terminal apparatus 100a has no longer been capable of communicating with these access points (or access point group). As a result of this, it is determined that the user has stayed at location P1 between 0:00-9:00 and 18:00-23:59, has stayed at location P2 between 9:30-12:00 and 13:00-17:00, and has stayed at location P3 between 12:00-13:00. Further, the time at which the user was not staying at any of the locations, that is, between 9:00-9:30 and 17:00-18:00, can be assumed to be when the user was moving.

Information of a stay location and a stay time acquired such as described above may be used, for example, for an automatic assumption of location attributes of the user in action recognition technology. For example, since location P1 is a location at which the user stays from nighttime until morning, it may be assumed that it is a returning location, that is, "Home". On the other hand, since location P2 is a location at which the user stays a long time during the daytime, it may be assumed to be a working location, that is, "Office". Further, it is possible to specify a life pattern of the user, and to determine weekdays/holidays and normal days/unusual days, from the stay time in each of the locations and the order of transitions between locations. For example, in the case where the user who repeats a transition pattern of stay locations, such as P1 (morning) to P2 to P3 (daytime) to P2 to P1 (nighttime) such as in the example shown in FIG. 10, has moved in a transition pattern different to this on a certain day, it is assumed that this day was a holiday of the user, or was a day on which the user worked at a different location to that of a normal day (a business trip or the like).

Further, by accumulating the time of arrival and departure of each of the stay locations as a history, it becomes possible to predict the stay location of a user and the arrival/departure schedule times of this location. At this time, it is possible to calculate the reliability of a prediction, from variations of the arrival/departure times in the history. For example, in the case where the history of a transition between stay locations such as shown in FIG. 10 is accumulated over a prescribed time period, if the user is staying at location P1 (home) at 8:30, it can be predicted that the user will start movement to location P2 (office) by soon departing from location P1 (home), and traffic information of a movement route or the like can be provided. Further, if the user is moving by departing location P1 (home) at 9:20, it can be predicted that the user will soon arrive at location P2 (office), and schedule information of today or the like at the office can be provided.

(Display of the Stay Location)

Figure 11:
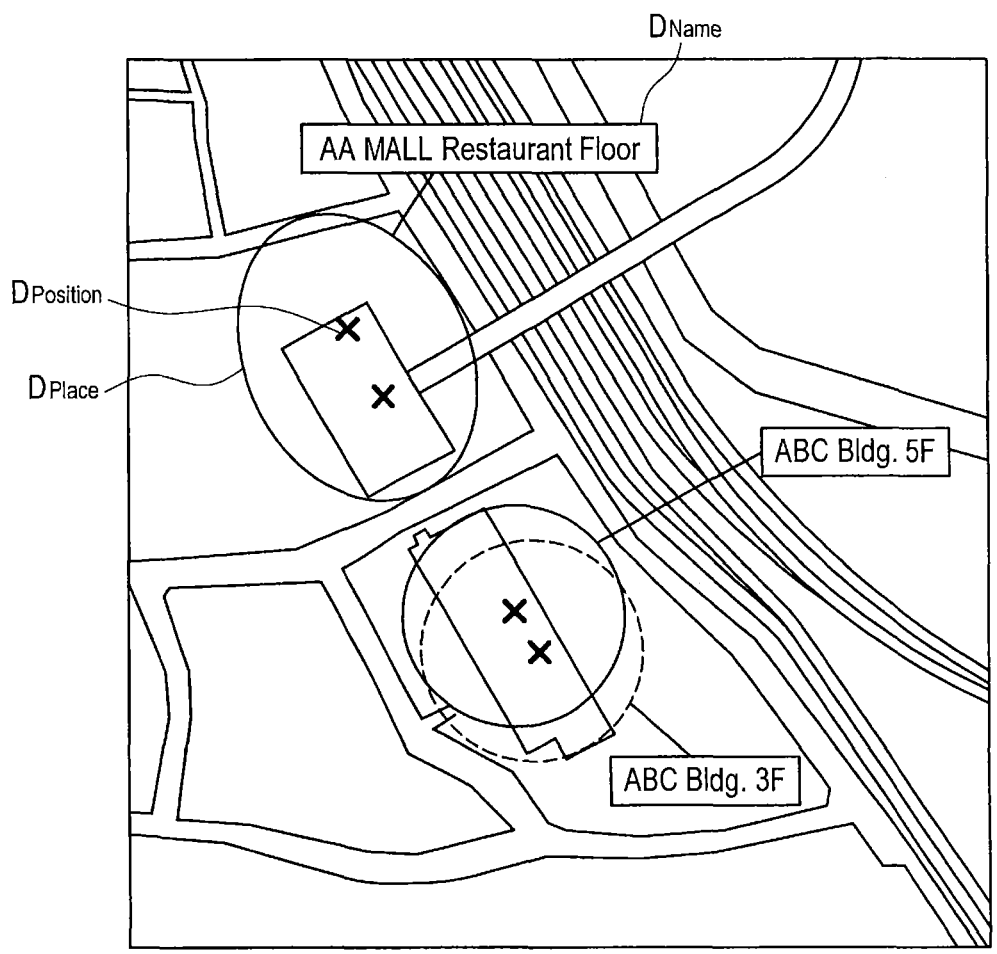
FIG. 11 is a figure which shows an example displaying stay locations on a map in the first embodiment of the present disclosure.
Figure 12:
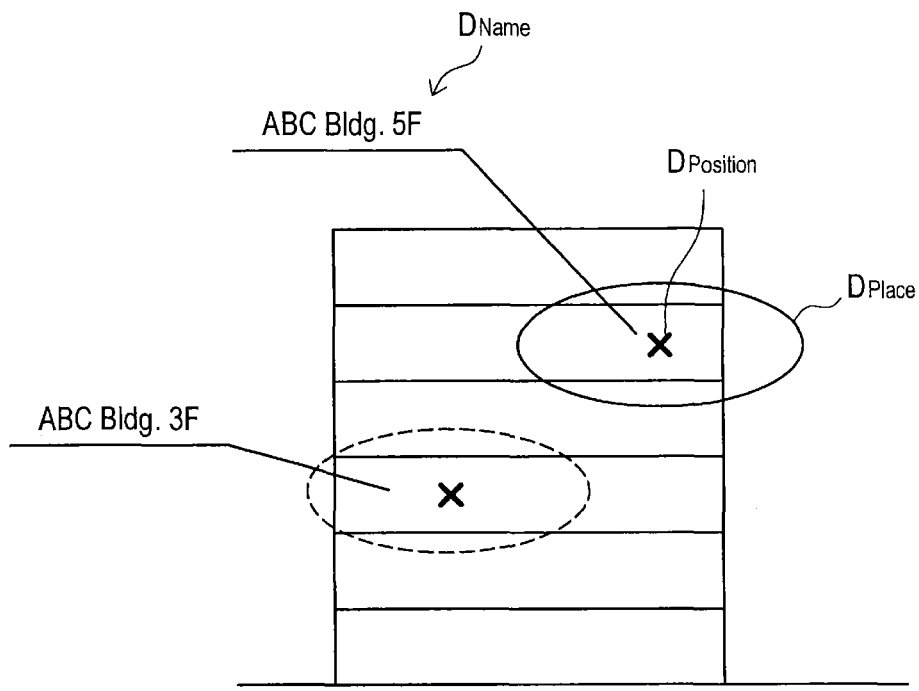
FIG. 12 is a figure which shows an example displaying stay locations on a map in the first embodiment of the present disclosure.

FIG. 11 and FIG. 12 are figures which show examples displaying stay locations on a map in the first embodiment of the present disclosure. As described above, by having the location specification unit 160 associate position information with a stay location detected by the stay detection unit 140, based on position information of access points provided by a result of measurements using GPS or the like or an external service, or an input of position information or the like by a user, it becomes possible for the display control unit 170 to display the stay location on a map.

In the present embodiment, each of the stay locations are specified as locations at which the terminal apparatus 100a is capable of communicating with specific access points (or an access point group). Therefore, such as in the examples shown in FIG. 11 and FIG. 12, a display $D_{Place}$ which shows a stay location on a map may be expressed as a region having an expanse corresponding to an expanse of radio waves from the access points. In FIG. 11, position information associated with each of the stay locations (latitude and longitude information) is displayed as a position display $D_{Position}$, and a display $D_{Place}$ of a stay location is expressed as a region of a prescribed range which includes the position display $D_{Position}$. In the case where the name of a stay location is provided by information provided by an external service, information input by a user or the like, a name display $D_{Name}$ of the stay location may also be displayed.

Here, in the case where a plurality of position information is associated to one stay location, the display $D_{Place}$ of the stay location may be expressed as a range which includes the plurality of associated position information. The size of the display $D_{Place}$ of the stay location may be set corresponding to the size of the communication area of the access points. Note that, since each of the stay locations are set based on the access points capable of communicating regardless of the position information, a plurality of different stay locations may be set if access points capable of communicating for different floors of a building or the like are different, even if at a same position of latitude and longitude. In such a case, while a display $D_{Place}$ of the plurality of stay locations will overlap with a plane map or the like such as in FIG. 11, for example, a display $D_{Place}$ of each of the stay locations can be separated if elevations are shown as a map such as in FIG. 12. In this case, the height of each of the stay locations may be set based on altitude information detected by an atmospheric pressure sensor or the like, or may be set based on position information of access points provided by an external service or information input by a user.

2. Second Embodiment

Figure 13:
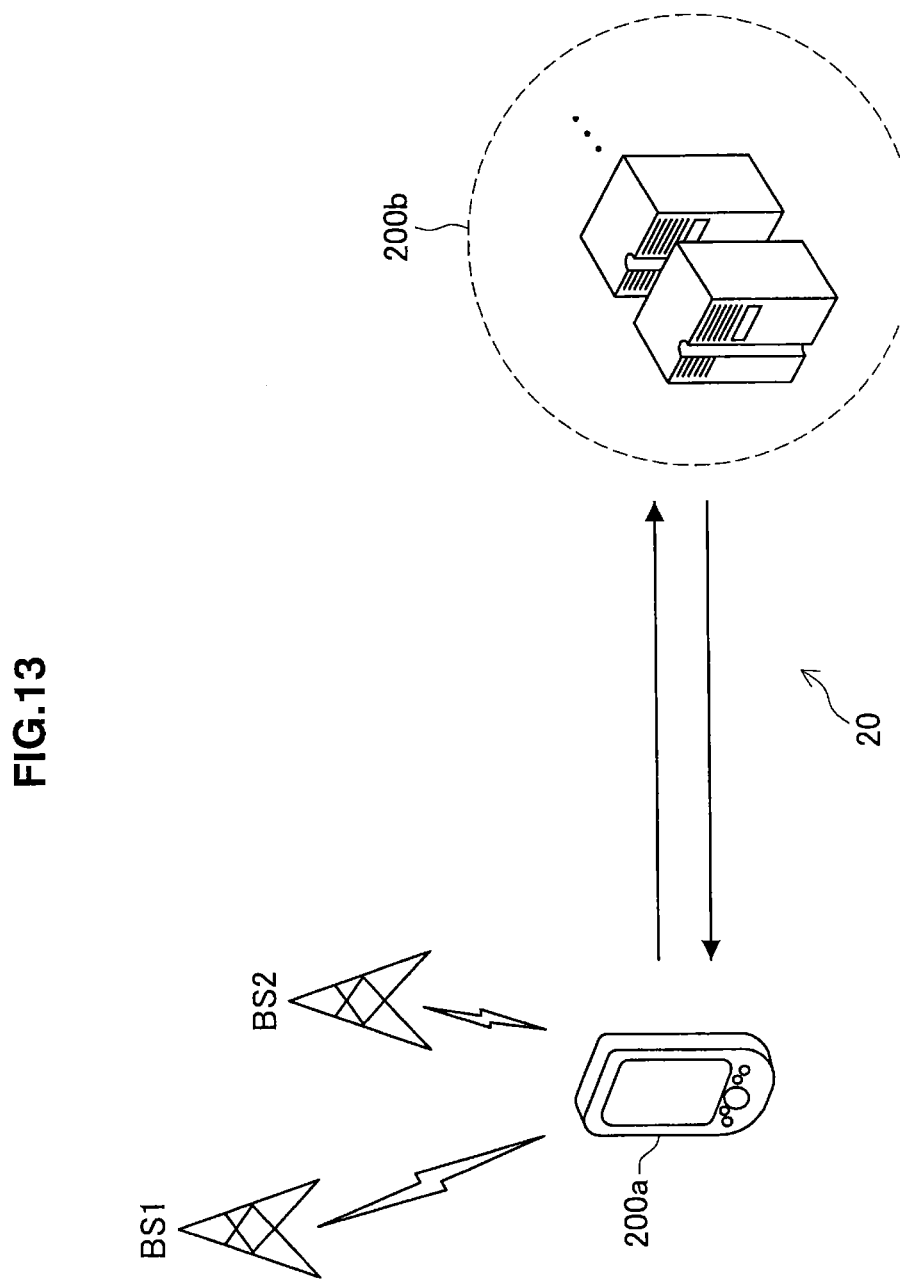
FIG. 13 is a figure which schematically shows a system configuration of a second embodiment of the present disclosure.

FIG. 13 is a figure which schematically shows a system configuration of a second embodiment of the present disclosure. With reference to FIG. 13, the system 20 according to the second embodiment of the present disclosure may include a terminal apparatus 200a and a server 200b. The terminal apparatus 200a is capable of communicating with base stations BS1 and BS2 of a mobile telephone network. Further, the terminal apparatus 200a may be capable of communicating with the server 200b via various types of wired or wireless networks. In this case, communication between the terminal apparatus 200a and the server 200b may be via either of the base stations BS1 and BS2, or may be via a different channel.

Here, while the system 20 according to the present embodiment is different to the system 10 according to the above described first embodiment for the point of that being used for detecting that the terminal apparatus 200*a* is staying at some location is information of a base station BS of a mobile telephone network capable of communicating, it may be the same other than this point. The terminal apparatus 200*a* may be various types of terminal apparatuses capable of communicating by connecting to a mobile telephone network, and may be, for example, a mobile phone (including a smartphone), a tablet-type terminal, a note-type or tablet-type PC, a portable-type media player, or a portable-type game device. Alternatively, the terminal apparatus 200*a* may not have a display unit such as included in an information terminal, and may be a sensor log terminal which merely acquires and transmits or accumulates sensing data, a mobile router used for Wi-Fi communication or the like. The server 200*b* may be implemented by a single server apparatus, or may be implemented by collaboration between a plurality of server apparatuses mutually connected by various types of wired or wireless networks. Further, a desktop-type PC or the like may be included in the server apparatus. The terminal apparatus 200*a*, or the one or a plurality of server apparatuses implementing the server 200*b*, may each be implemented by a hardware configuration of an information processing apparatus, which will be described later.

In the present embodiment, the terminal apparatus 200*a* staying at some location is detected, by using the base stations BS1 and BS2 the same as the access points AP1 and AP2 of the first embodiment shown in FIG. 1. Since the processes of this case can be easily understood by replacing Wi-Fi communication in the first embodiment with communication of a mobile telephone network, they will not be described in detail from here onwards. Hereinafter, a configuration will be specifically described, in the case where the terminal apparatus 200*a* is capable of communicating with both a mobile telephone network and Wi-Fi, that is, in the case where the terminal apparatus 200*a* is a mobile phone having a Wi-Fi communication function.

In this case, the wireless station information acquisition unit 120 of the information processing apparatus 100 (implemented by the terminal apparatus 200*a* or the server 200*b*) may acquire both information which shows Wi-Fi access points AP with which the terminal apparatus 200*a* is capable of communicating, and information which show the base stations BS of the mobile telephone network with which the terminal apparatus 200*a* is capable of communicating. The clustering unit 130 may generate access point clusters and base station clusters by respectively clustering access points AP and base stations BS. Further, the stay detection unit 140 may hierarchically detect a state in which the terminal apparatus 200*a* is staying at a location corresponding to an access point cluster, and a state in which the terminal apparatus 200*a* corresponds to a base station cluster.

The base stations BS of the mobile telephone network and the Wi-Fi access points AP are common for the point of each sending radio waves, and becoming capable of communicating with a terminal apparatus in a range (communication area) reached by these radio waves. However, the communication area of a base stations BS has a radius of several hundreds of meters to several kilometers, while in contrast the communication area of an access point AP is approximately several tens of meters, and the communication area of a base station BS is larger. On the other hand, the power consumption of communication will be greater for Wi-Fi communication than communication of a mobile telephone network.

In the case of communication of a mobile telephone network, since the communication area is wide, and since radio waves will continue to be received from the same base station BS even if the terminal apparatus 200*a* moves a small amount, in the case where a stay location of the terminal apparatus 200*a* is recognized based on a result of clustering the base stations BS capable of communicating, a stay location of a wider range will be recognized. Therefore, for example, while an office and cafeteria in a same building are recognized as different stay locations by recognition using access points AP, it may occur that these are recognized as a same stay location by recognition using base stations BS.

Figure 14:
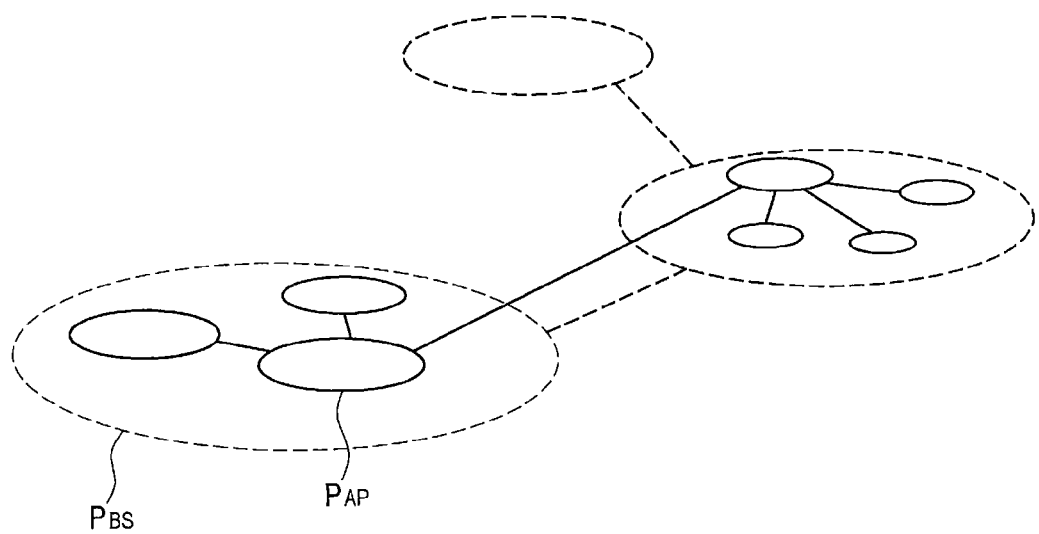
FIG. 14 is a figure for describing stay locations respectively recognized by base stations and access points in the second embodiment of the present disclosure.

FIG. 14 is a figure for describing stay locations respectively recognized by base stations and access points in the second embodiment of the present disclosure. As illustrated, a stay location $P_{BS}$ recognized by using base stations BS of a mobile telephone network encompasses a stay location $P_{AP}$ recognized by using Wi-Fi access points AP. That is, the stay location $P_{BS}$ and the stay location $P_{AP}$ have a hierarchical relationship in which the stay location $P_{BS}$ is set to a high rank, and the stay location $P_{AP}$ is set to a low rank. For this, the communication area of the base stations BS is larger than the communication area of the access points AP such as described above, and usually the access points AP are installed within the communication area of the base stations BS.

Figure 15:
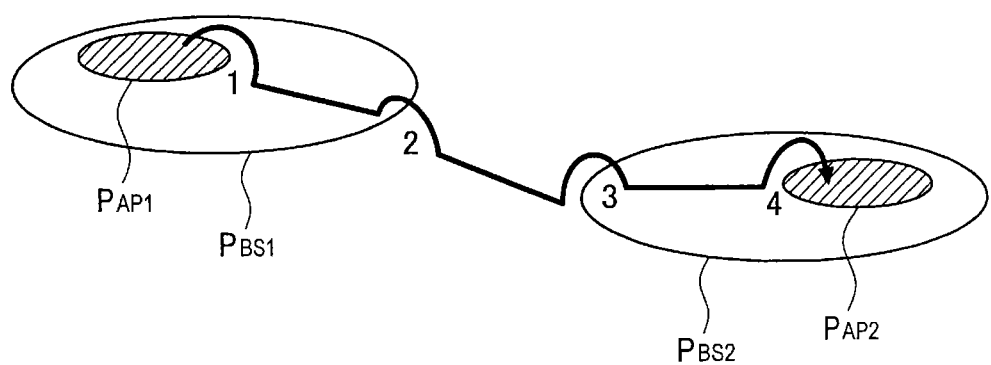
FIG. 15 is a figure for describing an example which controls the operations of a terminal apparatus while moving by using a hierarchical relationship of stay locations in the second embodiment of the present disclosure.
Figure 16:
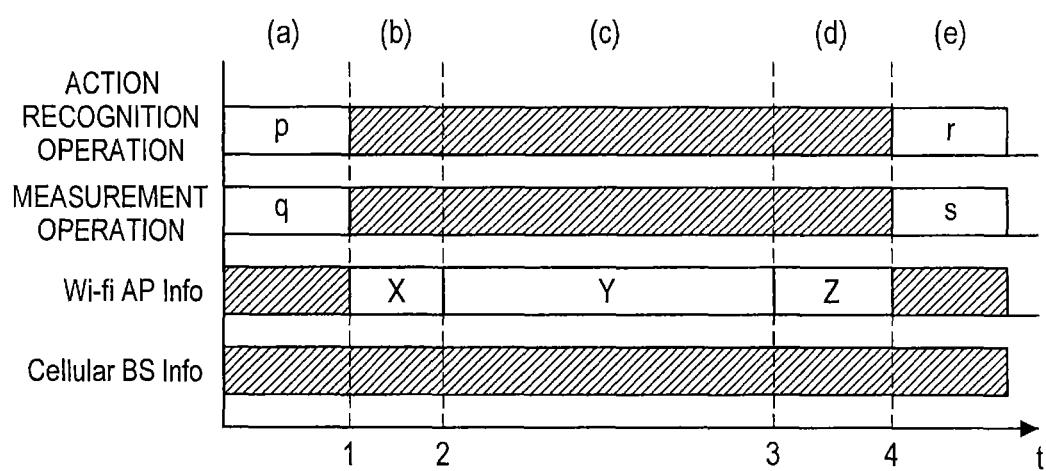
FIG. 16 is a figure for describing an example which controls the operations of a terminal apparatus while moving by using a hierarchical relationship of stay locations in the second embodiment of the present disclosure.

FIG. 15 and FIG. 16 are figures for describing examples in which the operations of the terminal apparatus are controlled while moving by using the hierarchical relationship of stay locations in the second embodiment of the present disclosure. With reference to FIG. 15, the terminal apparatus 200*a* moves from a stay location $P_{AP1}$ recognized based on information of access points AP up to a different stay location $P_{AP2}$ recognized based on information of the same access points AP. Here, the stay location $P_{AP1}$ is included in a stay location $P_{BS1}$ recognized based on information of base stations BS, and the stay location $P_{AP2}$ is included in a different stay location $P_{BS2}$ recognized based on information of base stations BS. Therefore, a user carrying the terminal apparatus 200*a* and moving will move from the stay location $P_{AP1}$ up to the stay location $P_{AP2}$ by the stages of (1) departing the stay location $P_{AP1}$, (2) departing the stay location $P_{BS1}$, (3) arriving at the stay location $P_{BS2}$, and (4) arriving at the stay location $P_{AP2}$.

The states of an action recognition operation, a measurement operation, Wi-Fi access point (AP) information acquisition, and base station (BS) information acquisition of a mobile telephone network, when moving such as shown in FIG. 15, are illustrated in FIG. 16. Note that, the numerals 1 to 4 correspond to the above described times of (1) to (4). Further, the sections divided by these times are shown as (a) to (e). Note that, in the case where the technology according to the present embodiment is not applied, for example, the action recognition operation, the measurement operation and the Wi-Fi AP information acquisition will continue to be executed in all of the sections (a) to (e), and power will be consumed for the respective operations.

In the figure, for the Wi-Fi AP information acquisition, a section X (time from the user departing the stay location $P_{AP1}$ up to also departing the stay location $P_{BS1}$), a section Y (time from the user departing the stay location $P_{BS1}$ up to arriving at the stay location $P_{BS2}$) and a section Z (time from the user arriving at the stay location $P_{BS2}$ up to arriving at the stay location $P_{AP2}$) are shown. Further, for the action recognition operation and the measurement operation, sections p and q (time when the user is staying at the stay location $P_{AP1}$), and sections r and s (time when the user is staying at the stay location $P_{AP2}$), are shown. Hereinafter, the control of the operations by the application of the present embodiment, in these sections, will be described.

In the above described example, for the measurement operation, the measurement operation of the terminal apparatus 200a may be stopped (or the interval extended), by the measurement control unit 150 of the information processing apparatus 100, while the user is staying at the stay location $P_{AP}$ recognized by using access points AP, that is, at section q and section s. In the case where the user carrying the terminal apparatus 200a is staying at some location, since it is assumed that a change of position of the user will be small, power consumption due to the measurement operation can be restrained, without lowering the accuracy of position detection of the user, by a control such as described above.

Similarly, for the action recognition operation, the action recognition operation of the terminal apparatus 200a may be stopped (or the interval extended), by the action recognition control unit 155 of the information processing apparatus 100, while the user is staying at the stay location $P_{AP}$ recognized by using access points AP, that is, at section q and section r. In the case where the user carrying the terminal apparatus 200a is staying at some location, since it is assumed that the possibility of the user riding a vehicle, for example, will be low, power consumption due to the action recognition operation can be restrained, without lowering the accuracy of action recognition of the user, by a control such as described above.

Further, for the Wi-Fi AP information acquisition, the terminal apparatus 200a may stop the acquisition of AP information (or extend the interval) in the section Y. As described above, there is a hierarchical relationship between the stay location $P_{BS}$ and the stay location $P_{AP}$, and the stay location $P_{AP}$ is encompassed in the stay location $P_{PB}$. Therefore, the terminal apparatus 200a will not arrive at the next stay location $P_{AP}$, while the terminal apparatus 200a is moving in the stay location $P_{BS}$. Therefore, by stopping the acquisition of AP information in this section, it is possible to restrain power consumption due to Wi-Fi communication, while maintaining the detection accuracy of the stay location $P_{AP}$.

On the other hand, the terminal apparatus 200a basically continues the acquisition of AP information, in section X and section Z. It is possible for the terminal apparatus 200a to arrive at the next stay location $P_{AP}$, while the terminal apparatus 200a is staying at the stay location $P_{BS1}$ or the stay location $P_{BS2}$. Therefore, since the terminal apparatus 200a recognizes the arrival to the next stay location $P_{AP}$, the acquisition of AP information will continue while executing Wi-Fi communication.

Note that, the terminal apparatus 200a may stop the acquisition of AP information (or extend the interval), based on a transition prediction of stay locations assumed from a transition history of stay locations of the past, in these sections. For example, in the case where there is a high possibility of also departing from the stay location $P_{BS1}$ after departing from the stay location $P_{AP1}$, that is, where it is assumed that there is a low possibility of arriving at another stay location $P_{AP}$ within the stay location $P_{BS1}$ after departing from the stay location $P_{AP1}$, from a transition history of stay locations of the past, the terminal apparatus 200a may stop the acquisition of AP information (or extend the interval), in section X.

3. Third Embodiment

Figure 17:
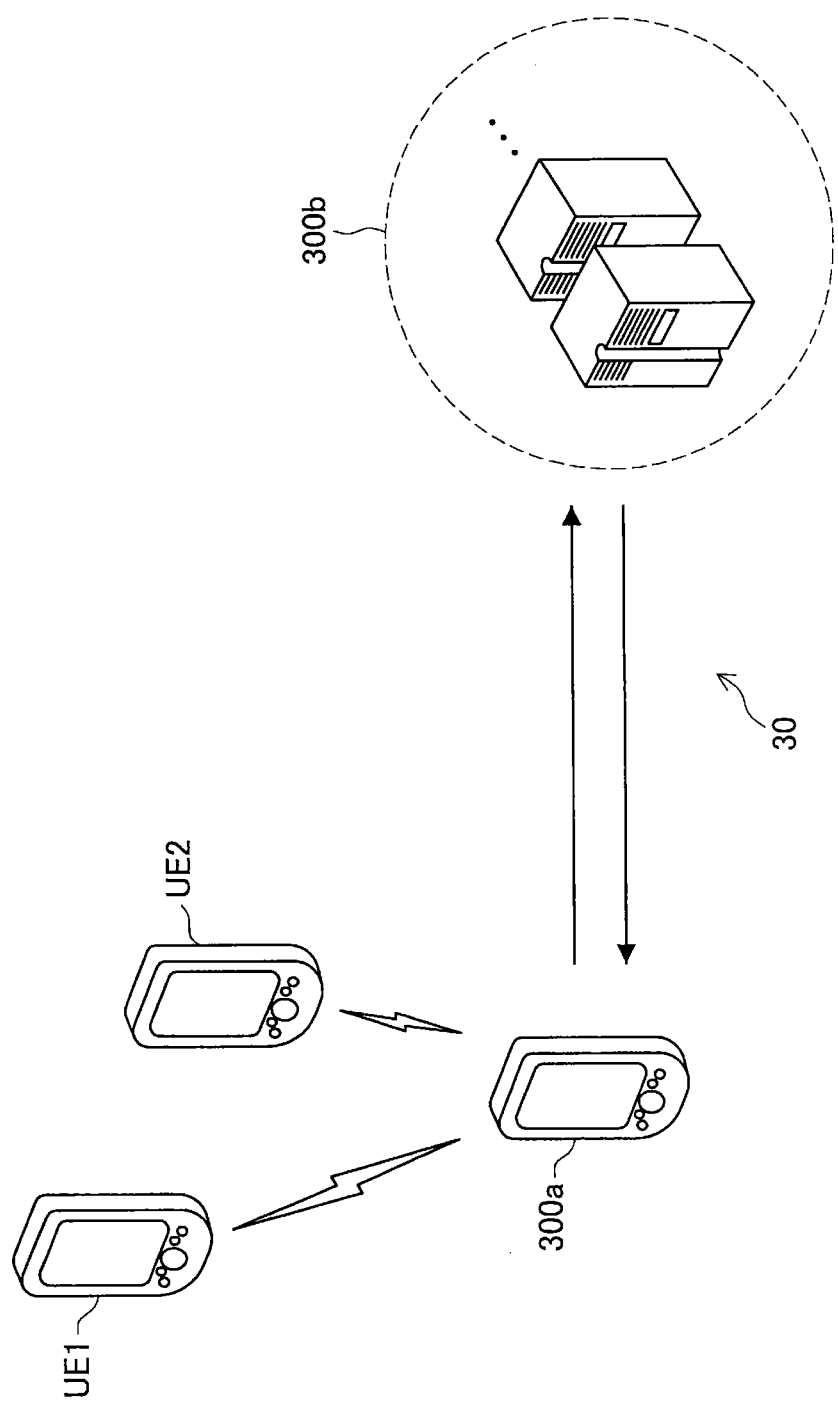
FIG. 17 is a figure which schematically shows a system configuration of a third embodiment of the present disclosure.

FIG. 17 is a figure which schematically shows a system configuration of a third embodiment of the present disclosure. With reference to FIG. 17, a system 30 according to the third embodiment of the present disclosure may include a terminal apparatus 300a and a server 300b. It is possible for the terminal apparatus 300a to communicate with other terminal apparatuses UE1 and UE2, for example, by ad-hoc communication such as Wi-FI or Bluetooth (registered trademark). Further, the terminal apparatus 300a may be capable of communicating with the server 300b via various types of wired or wireless networks. In this case, communication between the terminal apparatus 300a and the server 300b may be via either of the other terminal apparatuses UE1 and UE2, or may be via a different channel.

Here, while the system 30 according to the present embodiment is different to the system 10 according to the above described first embodiment for the point of that being used for detecting that the terminal apparatus 300a is staying at some location is information of another terminal apparatus UE, it may be the same other than this point. The terminal apparatus 300a may be various types of terminal apparatuses capable of ad-hoc communication, and may be, for example, a smartphone, a tablet-type terminal, a note-type or tablet-type PC, a portable-type media player, or a portable-type game device. The server 300b may be implemented by a single server apparatus, or may be implemented by collaboration between a plurality of server apparatuses mutually connected by various types of wired or wireless networks. Further, a desktop-type PC or the like may be included in the server apparatus. The terminal apparatus 300a, or the one or a plurality of server apparatuses implementing the server 300b, may each be implemented by a hardware configuration of an information processing apparatus, which will be described later.

In the present embodiment, the terminal apparatus 300a staying at some location is detected, by using the other terminal apparatuses UE1 and UE2 the same as the access points AP1 and AP2 of the first embodiment shown in FIG. 1. Since the processes of this case can be easily understood by replacing Wi-Fi communication (with fixed access points) in the first embodiment with ad-hoc communication, they will not be described in detail from here onwards.

The other terminal apparatus UE may be a terminal apparatus which moves, for example, by being carried by a user the same as the terminal apparatus 300a. In this case, a stay location of the user carrying the terminal apparatus 300a may be detected by being capable of communicating with the other terminal apparatus UE, that is, by being in the vicinity of another user carrying the other terminal apparatus UE. For example, the user staying at an office may be detected, for example, by being capable of communicating with the other terminal apparatus UE carried by a work colleague, even if there are no access points AP installed in the vicinity of the office. Further, the user staying at his or her home may be detected by being capable of communicating with the other terminal apparatus UE carried by a family member, even if there are no access points AP installed in the vicinity of the home.

In the present embodiment, the information processing apparatus 100 (implemented by the terminal apparatus 300a or the server 300b) may have a location specification unit 160. The location specification unit 160 may associate a stay location with position information, similar to that of the first embodiment, for example, based on a result of measurements executed by the terminal apparatus 300a. Alternatively, the location specification unit 160 may associate a stay location of the user with information of a user of the other terminal apparatus UE acquired by ad-hoc communication. In this case, the stay location of the user may be identified, for example, as "a location the same as that of a work colleague (office)", "a location the same as that of a family member (home)" or the like.

4. Hardware Configuration

Figure 18:
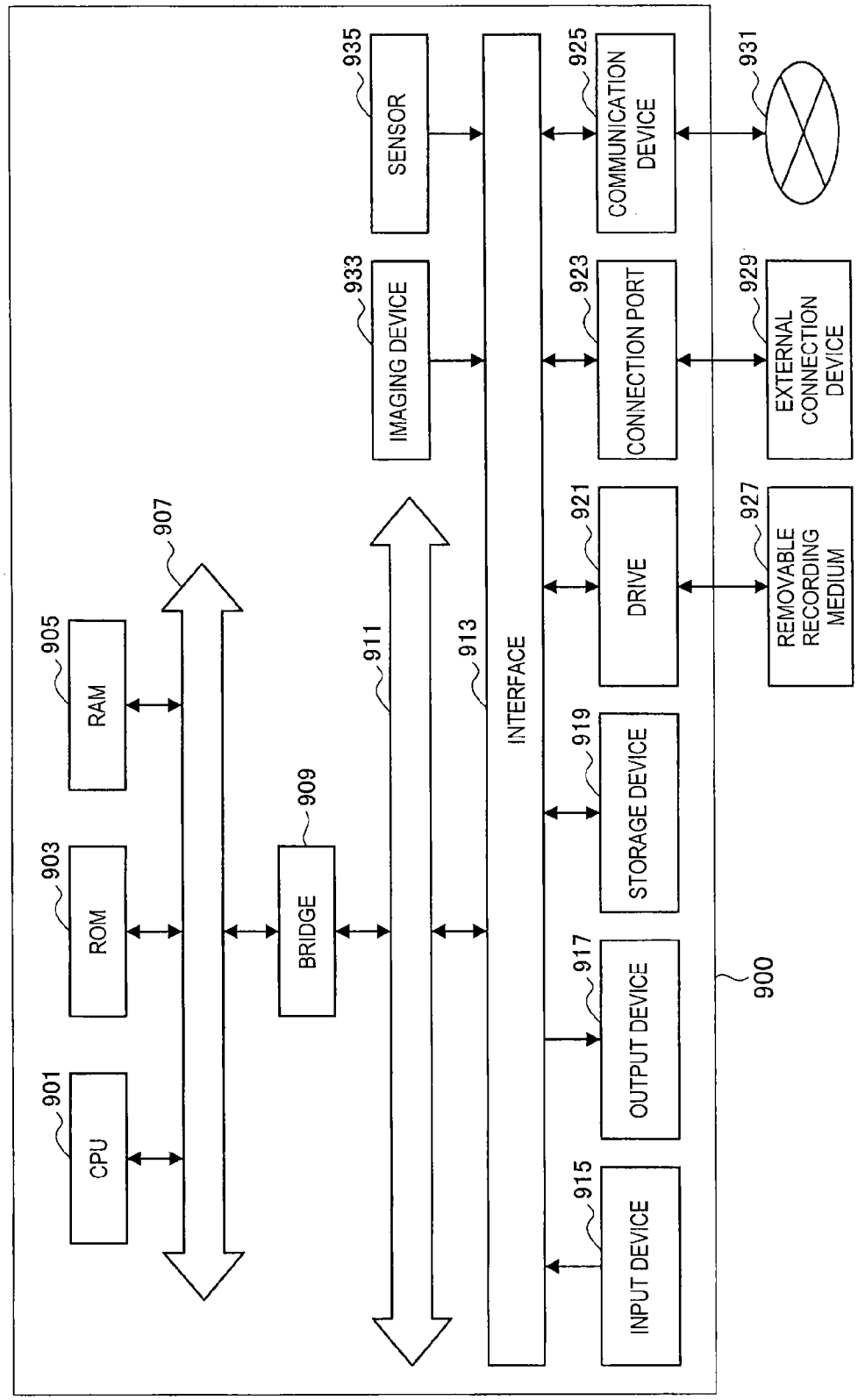
FIG. 18 is a block diagram for describing a hardware configuration of an information processing apparatus.

Next, the hardware configuration of an information processing apparatus according to an embodiment of the present disclosure will be described with reference to FIG. 18. FIG. 18 is a block diagram illustrating the hardware configuration of an information processing apparatus. Information processing apparatus 900 illustrated can realize, for example, the terminal apparatus or the server in the above embodiment.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 primarily stores program which are used in the execution of the CPU 901 and parameters which is appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 may be a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as LCD (Liquid Crystal Display), PDP (Plasma Display Panel), and organic EL (Electro-Luminescence) displays, an audio output device such as speaker and headphone, and a peripheral device such as printer. The output device 917 may output the results obtained from the process of the information processing apparatus 900 in a form of a video such as text or image, and an audio such as voice or sound.

The storage device 919 is a device for data storage which is configured as an example of a storage unit of the information processing apparatus 900. The storage device 919 includes, for example, a magnetic storage device such as HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 can write in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, a sound sensor, or a pressure sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

5. Supplemental Remarks

Embodiments of the present disclosure encompass an information processing apparatus (terminal apparatus or server) and system as described in the foregoing, an information processing method executed by an information processing apparatus or system, a program for causing an information processing apparatus to function, and a non-transitory computer readable medium storing such a program, for example.

In the description of the above described embodiments, while wireless communication by a Wi-Fi standard, communication of a mobile telephone network and communication by Bluetooth (registered trademark) have been illustrated as systems in which a terminal apparatus communicates with wireless stations, the embodiments of the present disclosure are not limited to such examples. In any of the cases where a terminal apparatus may communicate with wireless stations by such a system, it is possible to detect that the terminal apparatus is staying at some location the same as that of the above described embodiments, if only obtaining information which identifies the wireless stations.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)
An information processing apparatus including:
a wireless station information acquisition unit which acquires information showing wireless stations with which a terminal apparatus is capable of communicating;
a clustering unit which generates a wireless station cluster by clustering the wireless stations based on a time at which the wireless stations are capable of communicating with the terminal apparatus; and
a stay detection unit which detects a state in which the terminal apparatus is capable of communicating with wireless stations included in the wireless station cluster as a state in which the terminal apparatus is staying at a location corresponding to the wireless station cluster.

(2)
The information processing apparatus according to (1),
wherein the clustering unit generates a preliminary cluster by clustering the wireless stations based on information acquired in a prescribed time period, and updates the wireless station cluster by combining the preliminary cluster with the wireless station cluster generated based on information acquired prior to the prescribed time period.

(3)
The information processing apparatus according to (2),
wherein, in a case where the preliminary cluster includes wireless stations in common with the wireless station cluster, the clustering unit adds other wireless stations included in the preliminary cluster to the wireless station cluster.

(4)
The information processing apparatus according to (2) or (3),
wherein the wireless station cluster includes a first wireless station cluster and a second wireless station cluster, and
wherein, in a case where the preliminary cluster includes both wireless stations in common with first wireless station cluster and wireless stations in common with the second wireless station cluster, the clustering unit merges the first wireless station cluster and the second wireless station cluster.

(5)
The information processing apparatus according to any one of (2) to (4),
wherein, in a case where the preliminary cluster does not include wireless stations in common with the wireless station cluster, the clustering unit adds a new wireless station cluster which includes wireless stations included in the preliminary cluster.

(6)
The information processing apparatus according to any one of (2) to (5),
wherein, in a determination of whether or not the preliminary cluster includes wireless stations in common with the wireless station cluster, the clustering unit disregards wireless stations with a low reliability from among wireless stations included in the wireless station cluster.

(7)
The information processing apparatus according to (6),
wherein the clustering unit calculates the reliability based on a time or frequency at which wireless stations included in the wireless station cluster are capable of communicating with the terminal apparatus.

(8)
The information processing apparatus according to any one of (1) to (7),
wherein the clustering unit generates a wireless station cluster by clustering wireless stations with a high reliability from among the wireless stations.

(9)
The information processing apparatus according to (8),
wherein the clustering unit calculates the reliability based on a time or frequency at which the wireless stations are capable of communicating with the terminal apparatus.

(10)
The information processing apparatus according to (8) or (9),
wherein the clustering unit calculates the reliability based on a strength of radio waves the terminal apparatus has received from the wireless stations.

(11)
The information processing apparatus according to any one of (8) to (10),
wherein the clustering unit calculates the reliability based on whether or not information specifying the wireless stations has been provided by a user or an external service.

(12)
The information processing apparatus according to any one of (1) to (11), further including:

a location specification unit which associates the location with position information; and a display control unit which, in a case where a state is detected in which the terminal apparatus is staying at the location, causes an image displaying the location on a map to be displayed on a display unit based on the position information.

(13)

The information processing apparatus according to (12), wherein the display control unit causes the location to be displayed as a region which includes a position corresponding to the position information and has a size corresponding to a communication area of the wireless stations.

(14)

The information processing apparatus according to any one of (1) to (13), further including:

a measurement control unit which, in a case where a state is detected in which the terminal apparatus is staying at the location, causes a measurement operation in the terminal apparatus to be stopped, or extends an interval of the measurement operation.

(15)

The information processing apparatus according to any one of (1) to (14), further including:

an action recognition control unit which, in a case where a state is detected in which the terminal apparatus is staying at the location, causes an action recognition operation in the terminal apparatus to be stopped, or extends an interval of the action recognition operation.

(16)

The information processing apparatus according to any one of (1) to (15), wherein the wireless station information acquisition unit acquires, as information showing the wireless stations, first information which shows wireless stations of a first communication system, and second information which shows wireless stations of a second communication system having a communication area encompassing a communication area of wireless stations of the first communication system, wherein the clustering unit generates a first wireless station cluster and a second wireless station cluster by respectively clustering wireless stations of the first communication system and wireless stations of the second communication system, wherein the stay detection unit respectively detects a state in which the terminal apparatus is staying at a location corresponding to the first wireless station cluster and a state in which the terminal apparatus is staying at a location corresponding to the second wireless station cluster, and wherein, in a case where a state is no longer detected in which the terminal apparatus is staying at a location corresponding to the second wireless station cluster, the wireless station information acquisition unit stops an acquisition of the first information, or extends an acquisition interval of the first information.

(17)

The information processing apparatus according to (16), wherein, in a case where a state is newly detected in which the terminal apparatus is staying at a location corresponding to the second wireless station cluster, the wireless station information acquisition unit starts an acquisition of the first information, or shortens an acquisition interval of the first information.

(18)

The information processing apparatus according to any one of (1) to (17), wherein the wireless station information acquisition unit acquires information which shows, as the wireless stations, other terminal apparatuses with which the terminal apparatus is capable of ad-hoc communication.

(19)

An information processing method including:

acquiring information showing wireless stations with which a terminal apparatus is capable of communicating;

generating a wireless station cluster by clustering the wireless stations based on a time at which the wireless stations are capable of communicating with the terminal apparatus; and detecting a state in which the terminal apparatus is capable of communicating with wireless stations included in the wireless station cluster as a state in which the terminal apparatus is staying at a location corresponding to the wireless station cluster.

(20)

A program which causes a computer to implement:

a function of acquiring information showing wireless stations with which a terminal apparatus is capable of communicating;

a function of generating a wireless station cluster by clustering the wireless stations based on a time at which the wireless stations are capable of communicating with the terminal apparatus; and a function of detecting a state in which the terminal apparatus is capable of communicating with wireless stations included in the wireless station cluster as a state in which the terminal apparatus is staying at a location corresponding to the wireless station cluster.

REFERENCE SIGNS LIST

100 information processing apparatus
100a, 200a, 300a terminal apparatus
100b, 200b, 300b server
110 communication unit
120 wireless station information acquisition unit
130 clustering unit
140 stay detection unit
150 measurement control unit
160 location specification unit
170 display control unit
180 display unit

The invention claimed is:

1. An information processing apparatus comprising:
   circuitry configured to
      acquire information showing wireless stations with which a terminal apparatus is capable of communicating,
      generate a wireless station cluster by clustering the wireless stations based on a time at which the wireless stations are capable of communicating with the terminal apparatus, and
      detect a state in which the terminal apparatus is capable of communicating with wireless stations included in the wireless station cluster as a state in which the terminal apparatus is staying at a location corresponding to the wireless station cluster, wherein
   the circuitry is configured to acquire, as information showing the wireless stations, first information which shows wireless stations of a first communication system, and second information which shows wireless stations of a second communication system having a communication area encompassing a communication area of wireless stations of the first communication system, the circuitry is configured to, when a state is detected in which the terminal apparatus is staying at the location, cause a measurement operation in the terminal apparatus to be stopped, and the circuitry is configured to respectively detect a state in which the terminal apparatus is staying at a location corresponding to a first wireless station cluster and a state in which the terminal apparatus is staying at a location corresponding to a second wireless station cluster, and when a state is no longer detected in which the terminal apparatus is staying at the location corresponding to the second wireless station cluster, stop an acquisition of the first information, or extend an acquisition interval of the first information.

2. The information processing apparatus according to claim 1, wherein the circuitry is configured to generate a preliminary cluster by clustering the wireless stations based on information acquired in a prescribed time period, and update the wireless station cluster by combining the preliminary cluster with the wireless station cluster generated based on information acquired prior to the prescribed time period.

3. The information processing apparatus according to claim 2, wherein, when the preliminary cluster includes wireless stations in common with the wireless station cluster, the circuitry is configured to add other wireless stations included in the preliminary cluster to the wireless station cluster.

4. The information processing apparatus according to claim 2, wherein the wireless station cluster includes the first wireless station cluster and the second wireless station cluster, and wherein, when the preliminary cluster includes both wireless stations in common with first wireless station cluster and wireless stations in common with the second wireless station cluster, the circuitry is configured to merge the first wireless station cluster and the second wireless station cluster.

5. The information processing apparatus according to claim 2, wherein, when the preliminary cluster does not include wireless stations in common with the wireless station cluster, the circuitry is configured to add a new wireless station cluster which includes wireless stations included in the preliminary cluster.

6. The information processing apparatus according to claim 2, wherein, in a determination of whether or not the preliminary cluster includes wireless stations in common with the wireless station cluster, the circuitry is configured to disregard wireless stations with a low reliability from among wireless stations included in the wireless station cluster.

7. The information processing apparatus according to claim 6, wherein the circuitry is configured to calculate the reliability based on a time or frequency at which wireless stations included in the wireless station cluster are capable of communicating with the terminal apparatus.

8. The information processing apparatus according to claim 1, wherein the circuitry is configured to generate a wireless station cluster by clustering wireless stations with a particular reliability from among the wireless stations.

9. The information processing apparatus according to claim 8, wherein the circuitry is configured to calculate the reliability based on a time or frequency at which the wireless stations are capable of communicating with the terminal apparatus.

10. The information processing apparatus according to claim 8, wherein the circuitry is configured to calculate the reliability based on a strength of radio waves the terminal apparatus has received from the wireless stations.

11. The information processing apparatus according to claim 8, wherein the circuitry is configured to calculate the reliability based on whether or not information specifying the wireless stations has been provided by a user or an external service.

12. The information processing apparatus according to claim 1, wherein the circuitry is configured to associate the location with position information, and when the state is detected in which the terminal apparatus is staying at the location, cause an image displaying the location on a map to be displayed on a display based on the position information.

13. The information processing apparatus according to claim 12, wherein the circuitry is configured to cause the location to be displayed as a region which includes a position corresponding to the position information and has a size corresponding to a communication area of the wireless stations.

14. The information processing apparatus according to claim 1, wherein the circuitry is configured to when the state is detected in which the terminal apparatus is staying at the location, cause an action recognition operation in the terminal apparatus to be stopped, or extend an interval of the action recognition operation.

15. The information processing apparatus according to claim 1, wherein the circuitry is configured to generate the first wireless station cluster and the second wireless station cluster by respectively clustering wireless stations of the first communication system and wireless stations of the second communication system.

16. The information processing apparatus according to claim 15, wherein, when a state is newly detected in which the terminal apparatus is staying at the location corresponding to the second wireless station cluster, the circuitry is configured to start an acquisition of the first information, or shorten an acquisition interval of the first information.

17. The information processing apparatus according to claim 1, wherein the circuitry is configured to acquire information which shows other terminal apparatuses with which the terminal apparatus is capable of ad-hoc communication.

18. An information processing method comprising:
- acquiring information showing wireless stations with which a terminal apparatus is capable of communicating;
- generating a wireless station cluster by clustering the wireless stations based on a time at which the wireless stations are capable of communicating with the terminal apparatus;
- detecting a state in which the terminal apparatus is capable of communicating with wireless stations included in the wireless station cluster as a state in which the terminal apparatus is staying at a location corresponding to the wireless station cluster;
- when a state is detected in which the terminal apparatus is staying at the location, causing a measurement operation in the terminal apparatus to be stopped, wherein
- the acquiring acquires, as information showing the wireless stations, first information which shows wireless stations of a first communication system, and second information which shows wireless stations of a second communication system having a communication area encompassing a communication area of wireless stations of the first communication system;
- respectively detecting a state in which the terminal apparatus is staying at a location corresponding to a first wireless station cluster and a state in which the terminal apparatus is staying at a location corresponding to a second wireless station cluster; and
- when a state is no longer detected in which the terminal apparatus is staying at the location corresponding to the second wireless station cluster, stopping an acquisition of the first information, or extending an acquisition interval of the first information.

19. A non-transitory computer-readable storage medium including computer executable instructions, wherein the instructions, when executed by a computer, cause the computer to perform a method, the method comprising:
- acquiring information showing wireless stations with which a terminal apparatus is capable of communicating;
- generating a wireless station cluster by clustering the wireless stations based on a time at which the wireless stations are capable of communicating with the terminal apparatus;
- detecting a state in which the terminal apparatus is capable of communicating with wireless stations included in the wireless station cluster as a state in which the terminal apparatus is staying at a location corresponding to the wireless station cluster;
- when a state is detected in which the terminal apparatus is staying at the location, causing a measurement operation in the terminal apparatus to be stopped, wherein
- the acquiring acquires, as information showing the wireless stations, first information which shows wireless stations of a first communication system, and second information which shows wireless stations of a second communication system having a communication area encompassing a communication area of wireless stations of the first communication system;
- respectively detecting a state in which the terminal apparatus is staying at a location corresponding to a first wireless station cluster and a state in which the terminal apparatus is staying at a location corresponding to a second wireless station cluster; and
- when a state is no longer detected in which the terminal apparatus is staying at the location corresponding to the second wireless station cluster, stopping an acquisition of the first information, or extending an acquisition interval of the first information.

* * * * *